United States Patent [19]

Hirasawa

[11] Patent Number: 5,287,223
[45] Date of Patent: Feb. 15, 1994

[54] LENS DRIVE CONTROLLING APPARATUS

[75] Inventor: Masahide Hirasawa, Kanagawa, Japan

[73] Assignee: Canon Kabushiki Kaisha, Tokyo, Japan

[21] Appl. No.: 694,883

[22] Filed: May 2, 1991

[30] Foreign Application Priority Data

| May 10, 1990 | [JP] | Japan | 2-122037 |
| May 28, 1990 | [JP] | Japan | 2-139037 |
| May 28, 1990 | [JP] | Japan | 2-139038 |

[51] Int. Cl.⁵ .................................. G02B 15/14
[52] U.S. Cl. ........................ 359/697; 354/195.12; 354/400; 348/345
[58] Field of Search ........... 359/694, 696, 697, 698; 354/400, 402, 195.1, 195.12; 358/227

[56] References Cited

U.S. PATENT DOCUMENTS

| 4,896,179 | 1/1990 | Watanabe et al. | 354/195.1 |
| 4,920,369 | 4/1990 | Kaneda et al. | 354/400 |
| 4,950,054 | 8/1990 | Wada et al. | 354/400 |
| 4,991,944 | 2/1991 | Hirao et al. | 359/698 |
| 5,005,956 | 4/1991 | Kaneda et al. | 354/402 |
| 5,038,163 | 8/1991 | Hirasawa | 354/400 |
| 5,144,491 | 9/1992 | Ushiro et al. | 359/697 |
| 5,144,492 | 9/1992 | Iijima et al. | 359/698 |

FOREIGN PATENT DOCUMENTS

407914A2 1/1991 European Pat. Off.

Primary Examiner—Bruce Y. Arnold
Assistant Examiner—James Phan
Attorney, Agent, or Firm—Robin, Blecker, Daley & Driscoll

[57] ABSTRACT

A lens drive controlling apparatus includes a zooming lens, a focusing lens driven in follow-up relation to a movement of the zooming lens on the basis of a predetermined characteristic, a speed sensor for detecting a driving speed of the zooming lens, and a control circuit for determining a driving speed of the focusing lens on the basis of a detection result provided by the speed sensor.

27 Claims, 14 Drawing Sheets

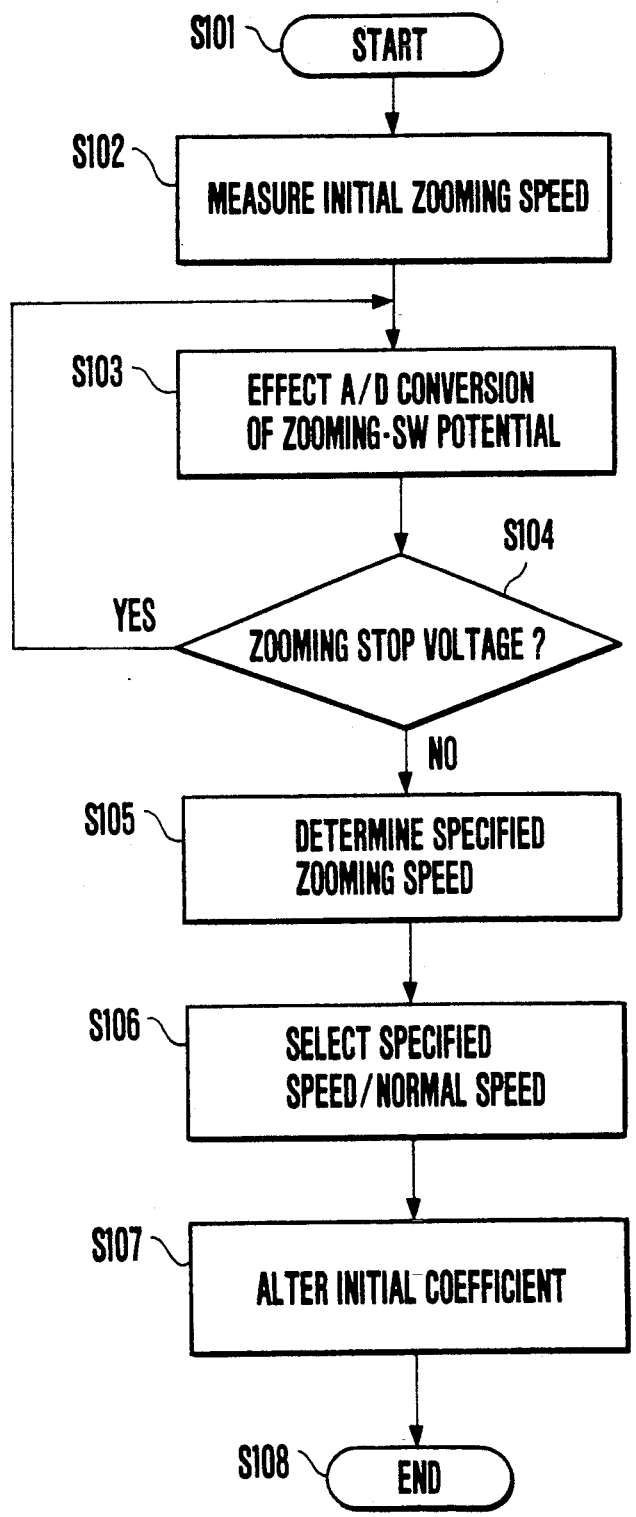

LENS DRIVE CONTROLLING APPARATUS

BACKGROUND OF THE INVENTION

1. Field of the Invention

The present invention relates to a drive controlling apparatus suitable for use as a lens controlling apparatus for a camera or the like.

2. Description of the Related Art

The recent development of video instruments such as video cameras, electronic still cameras and camera-integrated VTRs is remarkable. In particular, the functions and operability of such video instruments have been greatly improved and their size and weight have been increasingly reduced. Among others, camera-integrated VTRs have been rapidly gaining in popularity, and great reductions in their size and weight have been realized owing to the minimization of the number of parts used per VTR as well as changes in the structures of the VTRs themselves.

For example, such a camera-integrated VTR includes a lens unit which requires relatively large space and parts.

FIG. 1 shows one example of a structure of a so-called inner focus type. The inner focus structure is known as an arrangement in which a front lens element is fixed in position and rear lens elements are used to vary magnification or to adjust focus, whereby the size of a lens unit can be minimized.

The lens unit shown in FIG. 1 includes a fixed front lens 101, a magnification varying lens (zooming lens) 102, an iris 103, a fixed third lens 104, and a fourth lens (focusing lens) 105 which performs a focusing function and the function (compensator function) of correcting the movement of a focal plane due to the movement of the zooming lens 102.

As magnification is varied by moving the zooming lens 102 in the lens unit arranged as shown in FIG. 1, the fourth lens 105 operates to perform the compensator function and the focusing function as described above. The manner of this operation is shown in FIG. 2.

FIG. 2 shows the positional relation between the zooming lens and the focusing lens with a subject distance as a parameter, and the horizontal axis represents the position of the zooming lens, while the vertical axis represents the position of the focusing lens. As is apparent from FIG. 2, during zooming, if the focusing lens moves along a locus unique to each subject distance, it is possible to continue the zooming without defocus, i.e., in an in-focus state. If the movement of the focusing lens deviates from the unique locus, defocus will occur.

A method of moving the focusing lens along a locus unique to each subject distance during zooming is proposed in, for example, Japanese Laid-open Patent Application No. Hei 1-280709. In this method, the loci of the focusing lens having the focusing function and the correcting function (compensator function) of correcting the movement of a focal plane due to the movement of the zooming lens shown in FIG. 2 are divided into zones each including a group of loci drawn at an approximately equal inclination, as shown in FIG. 3, and one speed is assigned to each of the zones as a representative speed. During zooming, any one of the zones is selected on the basis of the positional relation between the zooming lens and the focusing lens, and while both lenses are positioned within the selected zone, the focusing lens is made to move at the representative speed assigned to the zone.

However, the above-described method has the problem that the representative speed for each of the zones is determined with respect to a single zooming-lens moving speed and if the zooming-lens moving speed varies due to, for example, a variation in a zooming-motor output, a temperature change, a change in the attitude of the lens unit due to a change in a camera angle or the like, the focusing lens does not correctly follow the loci of FIG. 2.

Japanese Laid-open Patent Application No. Hei 1-319717 proposes a method of adjusting a zooming-lens driving speed during zooming by increasing or decreasing a coefficient to be multiplied by the aforesaid representative speed in accordance with a change in an actual zooming speed.

Referring to FIG. 3, for example, the horizontal axis is divided into 16 equal parts. If it is assumed that a design zooming speed is set to a speed which permits the zooming lens to move between a telephoto end (T) and a wide-angle end (W) in 7 seconds, 26 vertical sync periods (26 V sync) are required for the zooming lens to pass through a single zone 401 as shown in FIG. 4 in the case of the NTSC system. If N [V sync] is taken to pass through the single zone during actual zooming, the change ratio $R_{zs}$ of the actual zooming speed to a reference value (T$\leftrightarrow$W: 7 sec) of the zooming speed is expressed as:

$$R_{zs} = n/26 \qquad (1)$$

Accordingly, during zooming, by always measuring the number of vertical sync periods required to pass through the aforesaid single zone and multiplying $1/R_{zs}$ by the aforesaid representative speed, it is possible to perform the zooming at a focusing-lens moving speed according to a variation of the zooming speed without defocus.

However, the aforesaid example has the following disadvantages since the measurement of the zooming speed or calculations on Equation (1) have been performed by a microcomputer.

(i) If measured values or measurement results are stored in a volatile memory such as a RAM, the stored data are lost when a power source is turned off, and are not used for later control.

(ii) To compensate for the disadvantage (i), data may be stored in a non-volatile memory such as an $E^2$-PROM. However, if the lens unit is not used for a long time or an environment or the aforesaid attitude changes when the power source is again turned on, the zooming speed may change, causing zooming to start at an erroneous focusing-lens driving speed.

(iii) In association with the disadvantage (i), if zooming is initially performed with data lost after the power source has been turned on, focusing control does not respond to the zooming until a stable measured value N is obtained, and the zooming may start at an utterly different focusing-lens speed.

In a lens position detecting system utilizing the above-described example, if a variable-resistance type of encoder is used as, for example, a zooming-position detector, the following drawbacks will arise. As shown by 501 in FIG. 5, the state of a change in the resistance of the encoder with respect to the angle of rotation thereof may vary, depending on the angular position of the encoder. Otherwise, as shown by 502, a monotonic increase may be partially impaired and an irregular variation may occur.

If boundaries are provided in the output value of the zooming encoder to divide the entire zooming movement range into zones as shown in FIG. 3, the zones relative to the position of the zooming lens show a characteristic such as that shown in FIG. 6. The portion 601 of FIG. 6 has a zone length longer than a desired zone length due to the influence of the non-linear portion 501 of FIG. 5, whereas the zone value of the portion 602 of FIG. 6 undergoes chattering by the influence of the non-monotonic increase shown by 502 in FIG. 5.

For example, if the measurement of the zooming speed is performed by the above-described method, it will be determined that the speed measured at the portion 601 is slower than an actual zooming speed and that the speed measured at the portion 602 is far faster than the actual zooming speed. If such a measurement result is, as it is, applied to the focusing-lens moving speed during zooming, defocus will occur in the part of an image which corresponds to the portion 601 or 602.

To cope with the above-described disadvantage, an arrangement may be considered in which the speed of the zooming lens is actually measured and if the aforesaid abnormal measurement data is obtained, the data is not used in order to prevent abnormal follow-up operation of the focusing lens. However, for example, if zooming is initially performed after the power source of the apparatus is turned on, since no zooming speed has been measured, the above-described ratio Rzs is not determined from the moment the first zooming starts until the moment the first zooming speed is completely measured. As a result, the moving speed of the focusing lens is not appropriately controlled and defocus may take place.

SUMMARY OF THE INVENTION

A first object of the present invention which has been devised to solve the above-described problems is to provide a lens moving apparatus capable of effecting zooming free from defocus even immediately after a power source has been turned on.

A second object of the present invention is to provide a lens driving apparatus capable of effecting accurate zooming free from defocus during the actual driving of a zooming lens by measuring the speed at which the zooming lens is made to move by a small distance and determining the driving speed of the zooming lens.

A third object of the present invention is to provide a lens controlling apparatus which can measure the moving speed of a first lens before actual use to accurately adjust the moving speed of a second lens in accordance with the state of the apparatus from the initial movement of the first lens after a power source has been turned on, thereby providing lens control which can realize stable performance free from defocus and a good operational sensation.

A fourth object of the present invention is to provide a lens driving apparatus which can realize control of lenses, which move in predetermined relation to each other, without the use of a large-scale device such as an E$^2$PROM.

To achieve the above-described objects, in accordance with one aspect of the present invention, there is provided a lens driving apparatus which includes a first lens, a second lens driven in follow-up relation to a movement of the first lens on the basis of a predetermined characteristic, speed detecting means for detecting a driving speed of the first lens, and controlling means for determining a driving speed of the second lens on the basis of a detection result provided by the speed detecting means.

In accordance with another aspect of the present invention, there is provided a drive controlling apparatus which includes measurement means for measuring a moving speed of a first moving object, a second moving object which follows the movement of the first moving object on the basis of predetermined relation, driving means for varying a moving speed of the second moving object with respect to the moving speed of the first moving object, and computing means for determining the moving speed of the second moving object on the basis of a measurement result provided by the measurement means.

A fifth object of the present invention is to provide a lens driving apparatus which is arranged to predict a follow-up speed of a focusing lens by measuring a zooming-lens speed in, for example, a lens unit in which the focusing lens serving also as a compensator lens is made to follow the zooming lens, and which can prevent a problem such as disturbance of speed control due to a factor such as an abnormal output of an encoder.

A sixth object of the present invention is to provide a lens controlling apparatus which is arranged to control moving objects which move on the basis of predetermined relation, such as a zooming lens and a focusing lens in an inner focus type of video camera. The lens controlling apparatus is provided with the function of detecting the actual position or speed of a primary moving object during the movement thereof and determining the driving speed of a subsidiary moving object and the function of controlling the subsidiary moving object by ignoring an abnormal value or replacing it with temporary data if the abnormal value is detected among measured values. Accordingly, it is possible to achieve smooth and natural speed control without impairing the result of processing employing a position detecting signal.

To achieve the above-described object, in accordance with another aspect of the present invention, there is provided a drive controlling apparatus which includes a first lens, a second lens driven in follow-up relation to the movement of the first lens in accordance with a predetermined characteristic, detecting means for detecting a moving speed of the first lens or the amount of movement thereof, and controlling means for executing control of a driving speed of the second lens on the basis of a detection result provided by the detecting means, the controlling means using the detection result as information on the control only when the detection result meets a predetermined condition.

To achieve the above-described object, in accordance with another aspect of the present invention, there is provided a drive controlling apparatus which includes measurement means for measuring a moving speed of a first moving object, a second moving object which follows the movement of the first moving object on the basis of predetermined relation, driving means for varying a moving speed of the second moving object, and computing means for computing the moving speed of the second moving object on the basis of a measurement result provided by the measurement means and for computing the moving speed of the second moving object on the basis of predetermined control information which is stored in advance, if the measurement result does not satisfy a predetermined condition.

A seventh object of the present invention is to provide a lens controlling apparatus which can always accurately control the speed or the amount of movement of a second lens or moving object which follows a first lens or moving object on the basis of predetermined relation, and which can control the second lens or moving object with a normal value prepared in advance from the moment a power source is turned on until the moment the speed of the first lens or moving object is completely measured. Accordingly, optimum control can be performed immediately after the start of an operation, and a zooming lens can achieve a good zooming operation while minimizing defocus occurring during zooming, even before the measurement of a zooming speed is carried out.

An eighth object of the present invention is to provide a drive controlling apparatus which can perform highly accurate and stable control by determining the follow-up speed of a second moving object on the basis of the result obtained by measuring the moving speed of a first moving object, in a control system including the first moving object and the second moving object which follows the first moving object on the basis of predetermined relation. In addition, the drive controlling apparatus is arranged so that if the speed measurement of the primary first moving object is imperfect as in a case where control is initially performed after a power source has been turned on, the subsidiary second moving object is driven in accordance with the driving of the first moving object by using a temporary measurement result, and so that at the instant when the speed measurement of the primary first moving object is completed, the temporary measurement result is sequentially replaced with an actual measurement result. Accordingly, even if no measurement data on the primary first moving object is obtained, the drive controlling apparatus can execute speed control of the subsidiary second moving object without a large error.

A ninth object of the present invention is to provide a drive controlling apparatus which can smoothly transfer speed control from the speed control of the subsidiary second moving object based on temporary measurement data to the speed control of the subsidiary second moving object based on actual measurement data, whereby the drive controlling apparatus can be effectively used in a control system for driving the zooming lens and the focusing lens while holding them in predetermined relation.

To achieve the above-described objects, in accordance with another aspect of the present invention, there is provided a drive controlling apparatus which includes a first lens, a second lens driven in follow-up relation to the movement of the first lens in accordance with a predetermined characteristic, detecting means for detecting a moving speed of the first lens or the amount of movement thereof, and controlling means for selectively setting a first control mode for controlling a driving speed of the second lens on the basis of a detection result provided by the detecting means and a second control mode for forcibly controlling the second lens irrespective of the detection result.

In accordance with another aspect of the present invention, there is provided a drive controlling apparatus which includes measurement means for measuring a moving speed of the first moving object, a second moving object which follows a movement of the first moving object on the basis of predetermined relation, driving means for varying a moving speed of the second moving object, and controlling means for selectively setting a first control mode for computing the moving speed of the second moving object on the basis of a measurement result provided by the measuring means and a second control mode for setting the moving speed of the second moving object to a predetermined value irrespective of the measurement result.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 10 is a flowchart showing a control operation in the arrangement shown in FIG. 9;

DETAILED DESCRIPTION OF THE PREFERRED EMBODIMENTS

Preferred embodiments of the present invention will be described below with reference to the accompanying drawings.

Figure 7:
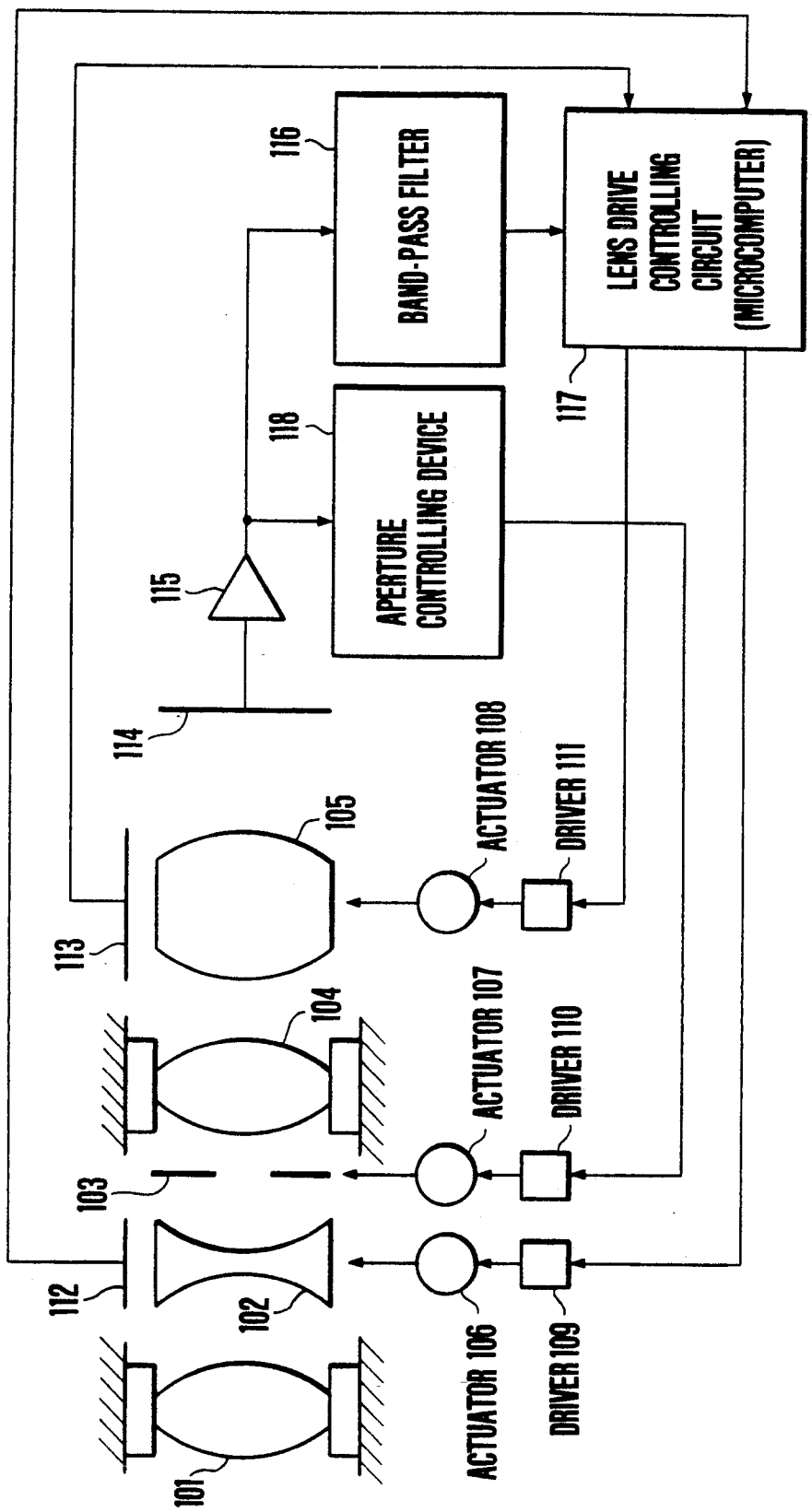
FIG. 7 is a schematic block diagram of a first embodiment, and shows a case where a drive controlling apparatus according to the present invention is applied to a video camera.

FIG. 7 is a block diagram schematically showing the arrangement of a first embodiment of a lens drive controlling apparatus according to the present invention.

Figure 1:
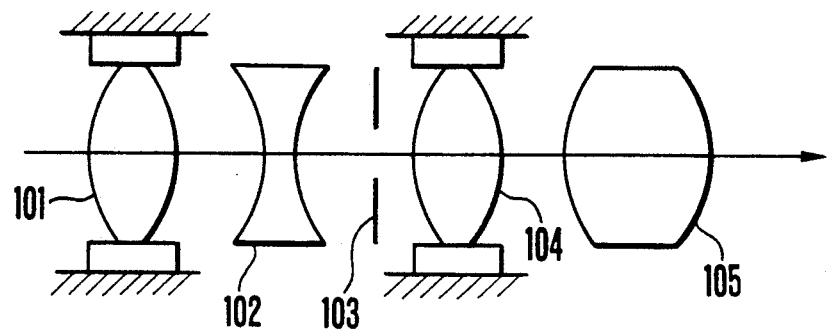
FIG. 1 is a schematic view showing one example of a general inner focus type of lens structure.

The lens drive controlling apparatus shown in FIG. 7 comprises optical system elements 101, 102, 103, 104 and 105 each having a function substantially identical to that of the corresponding element explained in connection with FIG. 1, actuators 106, 107 and 108 for driving the zooming lens 102, the iris 103 and the focusing lens 105, respectively, each of the actuators 106, 107 and 108 consisting of, for example, a motor or the like, drivers 109, 110 and 111 for driving and controlling the respective actuators 106, 107 and 108, position encoders 112 and 113 for detecting the position of the zooming lens 102 and that of the focusing lens 105, respectively, an image sensor 114, such as a charge-coupled device, for converting an image formed by a lens unit into a video signal and outputting it, an amplifier 115 for amplifying the output signal of the image sensor 114, a band-pass filter 116 for extracting only a high-band component useful for detecting the state of focus from the output signal of the amplifier 115, a lens drive controlling circuit 117 including a microcomputer for responding to the output signal of the band-pass filter 116 to execute various kinds of control, such as control for effecting focusing by moving the focusing lens 105 in the direction in which the high-band component increases or control for executing zooming by simultaneously moving the zooming lens 102 and the focusing lens 105 as explained in connection with the example described previously, and an aperture controlling device 118 for measuring the luminance of a subject on the basis of the luminance level of the output signal of the amplifier 115 and adjusting the aperture size of the iris 103 to maintain the luminance at a constant level.

Figure 8A:
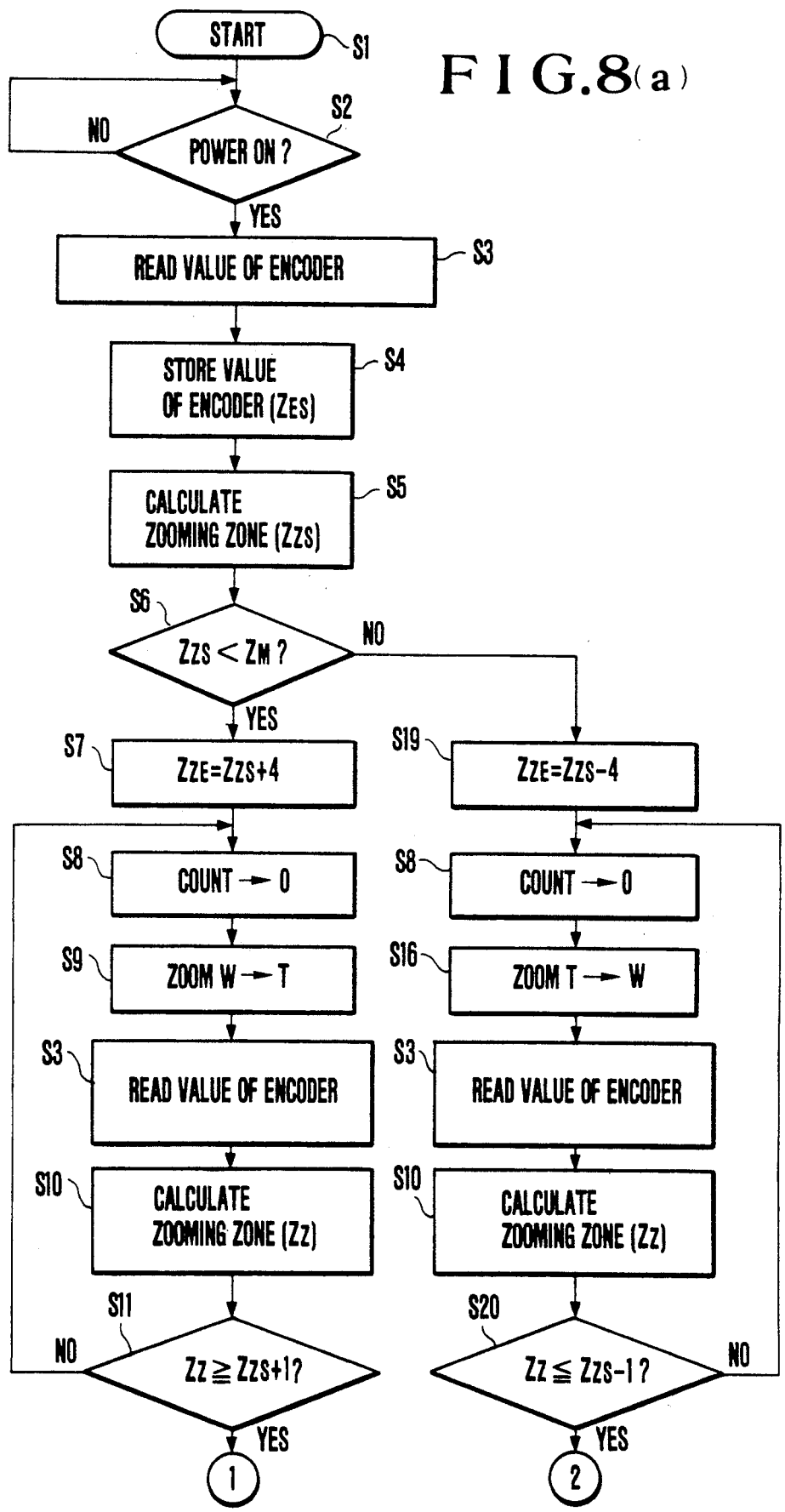
FIGS. 8(a) and 8(b) are a flowchart showing a control operation in the first embodiment shown in FIG. 7.
Figure 8B:
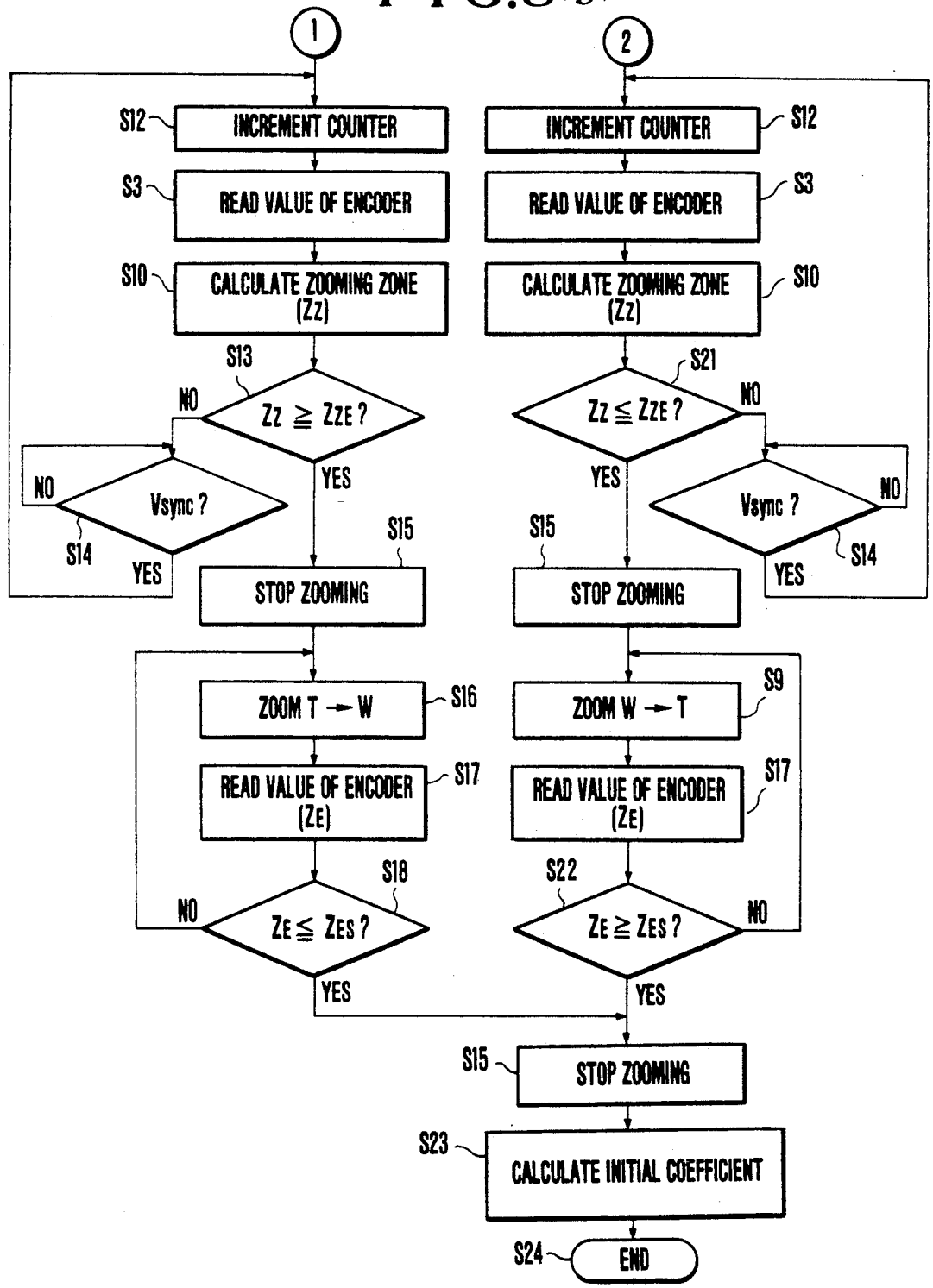

FIGS. 8(a) and 8(b) show a flowchart of a control program for operation control which is stored in the lens drive controlling circuit 117 for operating the lens drive controlling apparatus according to the present invention.

Figure 3:
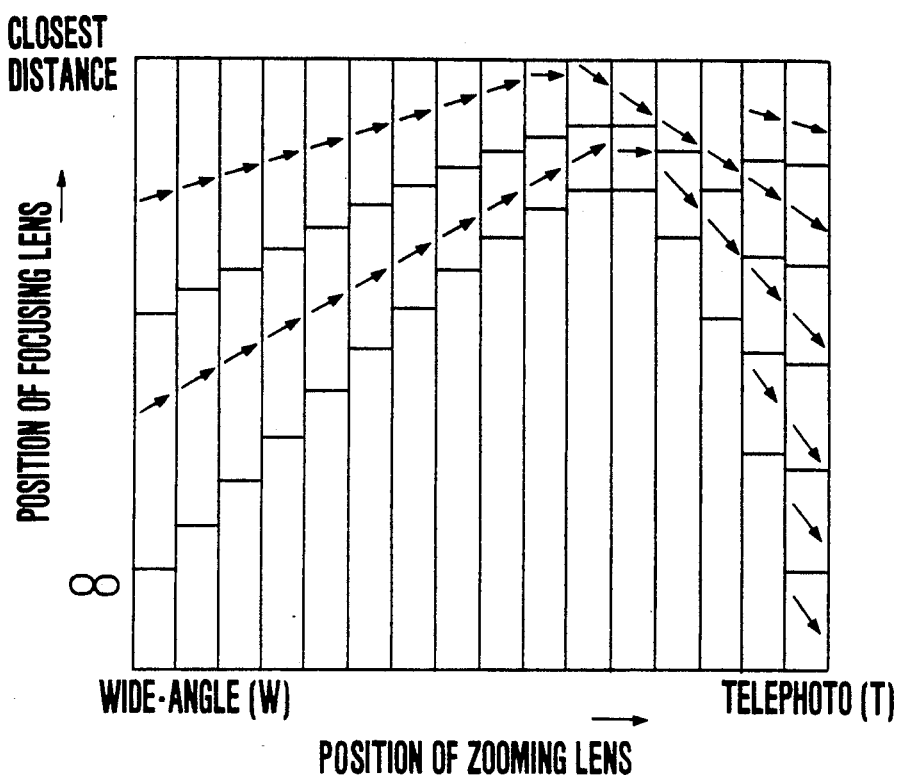
FIG. 3 is a chart showing a state wherein the positional relation between the position of the zooming lens and that of the focusing lens is divided into a plurality of zones and a representative speed of the focusing lens is set for each of the zones.

The control program shown in FIGS. 8(a) and 8(b) includes the following steps: Step S1 indicating the start of the control program; Step S2 where it is determined whether a power source has been turned on; Step S3 where the value of the zooming encoder 112, that is, the position of the zooming lens 102 which is in operation, is read out; Step S4 where the value of the zooming encoder 112, which has been read in Step S3, is memorized as Zzs; Step S5 where a zone in which the zooming lens 102 is positioned with It respect to the horizontal axis along, which zone division has been made as shown in FIG. 3, is computed from the value of ZES and the obtained position is stored in memory as Zzs; Step S6 where it is determined whether the zooming lens 102 is positioned closer to a wide-angle side or a telephoto side with respect to a value Zm indicative of a middle zone within the range of movement of the zooming lens 102; Step S7 where the measurement period during which the zooming-lens driving speed is measured is set to the duration of three zones defined in the direction of the horizontal axis along which zone division has been made as shown in FIG. 3, and where a measurement ending zone ZzE on the telephoto side is obtained from Zzs by computations; Step S8 where the value of a counter for measuring the driving speed of the zooming lens 102 is reset to "0"; Step S9 where the zooming lens 102 is made to move to the telephoto side; Step S10 where a zone in which the zooming lens 102 is positioned is compared in a manner similar to that used in Step S5, and the result is stored in memory as Zz; Step S11 where it is determined whether Zz is greater than or equal to Zzs+1, that is, whether the zooming lens 102 which has started from Zzs toward the telephoto side has moved from its starting zone into the next zone; Step S12 where the value of the counter which has been reset to "0" in Step S8 is incremented by one; Step S13 where it is determined whether Zz has reached ZzE, that is, whether zooming with respect to the three zones specified as the aforesaid measurement period has been completed; Step S14 where it is determined whether a vertical sync signal has been inputted; Step S15 for executing a program for stopping the zooming lens 102; Step S16 where the zooming lens 102 is made to move in the direction of the wide-angle side; Step S17 where, in a manner similar to Step S3, the output of the zooming encoder 112 for detecting the position of the zooming lens 102 is read and the result is stored in memory as ZE; Step S18 where it is determined whether ZE is less than ZES, that is, whether the zooming lens 102 has returned to the position obtained in Step S3; Step S19 corresponding to Step S7, for executing a program for computing a measurement ending zone on the wide-angle side by using Zzs; Step S20 corresponding to Step S11, where it is determined whether the zooming lens 102 has entered a zone adjacent to Zzs as the zooming lens 102 moves toward the wide-angle side; Step S21 corresponding to Step S13, where it is determined whether zooming with respect to the measurement period has been completed during the speed measurement performed while the zooming lens 102 is being driven toward the wide-angle side; Step S22 corresponding to Step S18, where it is determined whether the zooming lens 102 has returned to its initial position; Step S23 for executing a program for calculating Rzs according to the aforesaid equation (1); and Step S24 indicating the end of the flowchart shown in FIGS. 8(a) and 8(b).

If the program shown in the flowchart of FIGS. 8(a) and 8(b) starts in Step S1, then it waits for the power source to be turned on in Step S2. When the power source is turned on, the current detection value ZES of the zooming encoder 112, that is, a zooming-lens position, is read and stored in memory in Steps S3 and S4. In Step S5, the zone Zzs corresponding to the zooming-lens position ZES is obtained.

If variations in the measurement of a zooming speed are taken into account, it is desirable to perform zooming with respect to a plurality of zones. However, in a case where the direction of measurement is made unidirectional, if the zooming lens 102 is positioned in the vicinity of one end of its zooming movement range, the zooming lens 102 will reach the end until the measurement is completed. For this reason, in Step S6, it is determined whether the zooming lens 102 is positioned closer to the wide-angle side or the telephoto side with respect to the middle zone ZM in the zooming movement range. If the zooming lens 102 is positioned closer to the wide-angle side, the direction toward the telephoto side is selected as the measurement direction, while if it is positioned closer to the telephoto side, the direction toward the wide-angle side is selected as the measurement direction.

If it is determined in Step S6 that the zooming lens 102 is positioned closer to the wide-angle side, the process proceeds to Step S7, where the zone ZzE indicative of the end of measurement is determined by calculations. In the first embodiment, the number of zones in a measurement region is three. Accordingly, if Zzz is determined as in Step S7, when Zz obtained in Step S10 reaches ZZE, it may be determined that the zooming lens 102 has passed through such a measurement region. In Step S8 which follows, the counter is reset and, in Step S9, the zooming lens 102 is driven toward the telephoto side. In Steps S3 and S10, a zone in which the zooming lens 102 is positioned is computed sequentially.

Figure 4:
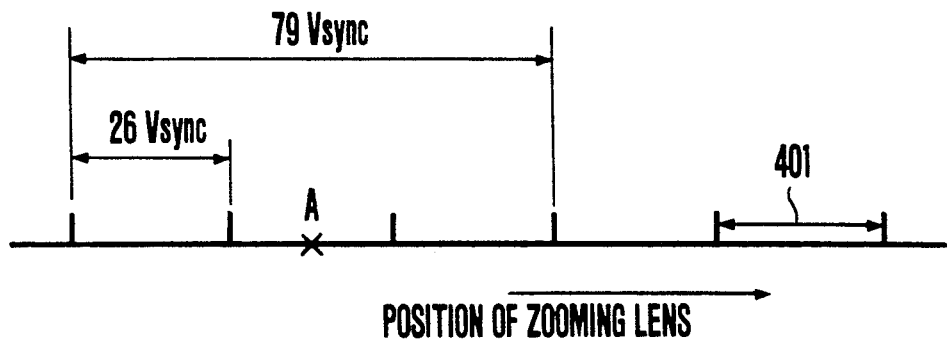
FIG. 4 is a schematic view which is used for explaining the speed measurement of the zooming lens.
Figure 5:
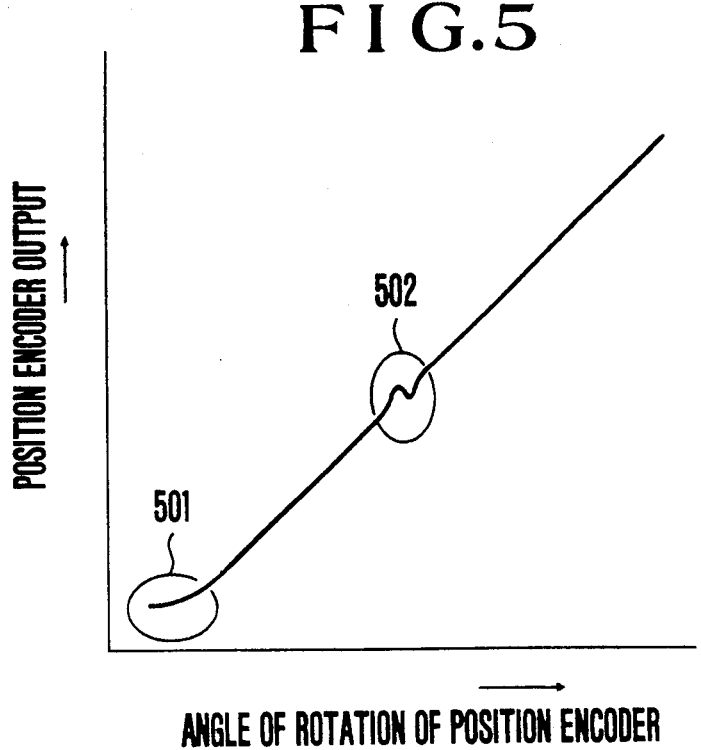
FIG. 5 is a characteristic chart showing the relation between the output and the angle of rotation of a position encoder for detecting the position of the zooming lens.

To accurately measure the time taken for the zooming lens 102 to pass through each of the three zones, it will be necessary to count the elapsed time between the boundaries of each of the zones in Step S12. However, in Step S3, the zooming lens 102 is not always positioned at any boundary; rather, the probability that the zooming lens 102 is positioned within any of the zones as indicated by a point A in FIG. 4, is high. For this reason, in Step S11, if the zooming lens 102 is still positioned in the same zone where it has started to move, the process returns to Step S8, where the count of the counter is not incremented. That state is held until the zooming lens 102 enters an adjacent zone. If the zooming lens 102 enters the adjacent zone, a program starting with Step S12 is executed.

Each time Step S12 is once executed, the count of the counter for measuring the driving speed of the zooming lens 102 is incremented by one. After Step S12 has been executed, the position of the zooming lens 102 is monitored in units of zone in Steps S3 and S10. In Step S13, it is determined whether the zooming lens 102 has passed through the three zones. If it is determined in Step S13 that it has not yet passed through the three zones, the process waits for arrival of a vertical sync signal in Step S14. If the vertical sync signal arrives, the process returns to Step S12, where the count of the counter is incremented by one. By performing the above-described processing, it is possible to measure as the number of vertical sync signals the time taken for zooming lens 102 to pass through each of the three zones from boundary to boundary without any substantial error. If it is determined in Step S13 that the measurement has been completed, a program starting with S15 is executed and the zooming lens 102 is returned to the position obtained in Step S3 to execute the operation of causing the viewing angle of the lens unit to coincide with a viewing angle to which the lens unit was set when the power source was turned on.

In Step S15, the zooming lens 102 is temporarily stopped. In Step S16, the zooming lens 102 is made to move in a direction opposite to the direction of movement during the above-described measurement, that is, toward the wide-angle side. Subsequently, in Step S17, the encoder's value is read as ZE in a way similar to that used in Step S3 and, in Step S18, it is determined whether ZE is equal to or smaller than ZES. If it is determined in Step S18 that the zooming lens 102 has not yet returned to its initial position, the process returns to step S16 and the above-described processing is repeated. If it is determined in Step S18 that the zooming lens 102 has returned to the initial position, the zooming operation is stopped in Step S15. In Step S23, an initial coefficient Rzs is calculated according to the above-described equation (1) and multiplied by a representative speed, thereby determining the start value of the focusing-lens driving speed for a first cycle of zooming operation after the power source has been turned on.

By performing the above-described operation, it is possible to determine the starting speed of the focusing lens under conditions close to actual operating conditions, and it is also possible to initiate photography in a state where no substantial change occurs in the viewing angle (the zooming lens returns to the initial position with an accuracy equivalent to the resolution of the zooming encoder after the completion of the above-described measurement).

The description of the first embodiment has been made with illustrative reference to the case where the zooming lens is positioned closer to the wide-angle side with respect to the middle of the zooming movement range. In a case where the zooming lens is positioned closer to the telephoto side with respect to the middle, an operation is carried out which is substantially identical to the above-described operation except that behavior is symmetrical. Description is, therefore, omitted for the sake of simplicity.

Figure 9:
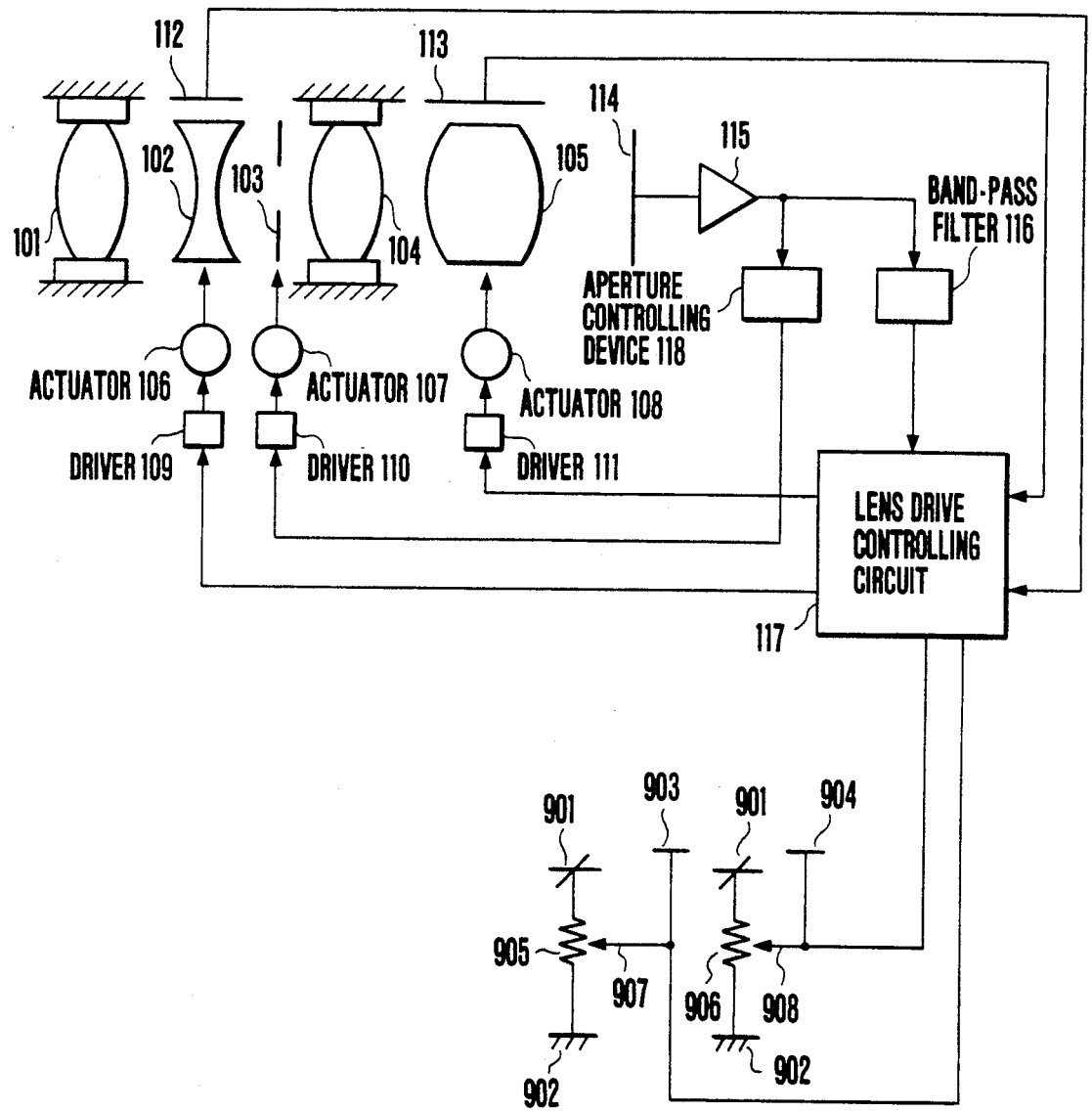
FIG. 9 is a schematic block diagram showing another embodiment of a control operation according to the present invention.

FIG. 9 is a block diagram schematically showing the arrangement of a second embodiment of the lens drive controlling apparatus according to the present invention. In FIG. 9, identical reference numerals are used to denote elements which are equivalent in function to those shown in FIG. 6.

The lens drive controlling apparatus shown in FIG. 9 is provided with a power source 901, a ground potential 902, a telephoto zooming switch 904 for driving the zooming lens 102 toward the telephoto side, a wide-angle zooming switch 904 for driving the zooming lens 102 toward the wide-angle side, a resistor 905 for the telephoto zooming switch 903, a resistor 906 for the wide-angle zooming switch 904, and brushes 907 and 908 in sliding contact with the respective resistors 905 and 906. As the switch 903 or 904 is depressed, the potential of the brush 907 or 908 continuously changes. The lens drive controlling circuit 117 reads this potential and causes the speed of rotation of the actuator 106 to decrease or increase so as to change the speed at which the zooming lens 102 is made to move.

FIG. 10 is a flowchart showing a control program installed in the lens drive controlling circuit 117 for the purpose of effecting the operation of the second embodiment having the arrangement of FIG. 9. The flowchart includes the following steps: Step S101 indicating the start of the program; Step S102 where a program is executed for executing the control operation shown as Steps S1 to S24 of FIGS. 8(a) and 8(b) explained in connection with the first embodiment; Step S103 where the potentials of the brushes 907 and 908 are converted from analog form to digital and read into the lens drive controlling circuit 117; Step S104 where it is determined whether the potential of the brush 907 or 908 indicates the stop of the zooming lens; Step S105 where a zooming speed is determined from the result obtained in Step S103; Step S106 where the ratio of the speed determined in Step S105 to the normal zooming speed used in determining the focusing-lens driving speed of FIG. 3 is obtained by calculations or selected from data which are prepared in memory in advance; Step S107 where an initial coefficient is changed to a value which matches a specified zooming speed by multiplying Rzs determined in Step S102 by the result of Step S106; and Step S108 indicating the end of the control program.

When the program starts in Step S101, the operation explained in connection with the first embodiment is executed in Step S102 to find Rzs. In Step S103, the potential of a zooming switch is converted from analog form to digital and, in Step S104, the state of the zooming switch is supervised. If it is determined in Step S104 that the potential of the zooming switch is at a zooming stop level, the process returns to Step S103 and the aforesaid operation is repeated. If it is determined in Step S104 that the potential of the zooming switch is at a zooming driving level, the process proceeds to Step S105, where a zooming speed corresponding to that potential level is selected. In Step S106, the ratio of the result of Step S105 to the normal zooming speed is obtained by calculations or by selection. By altering Rzs of Step S102 according to the result, it is possible to achieve advantages similar to those of the first embodiment even in the case of a camera system provided with a variable-speed zooming function.

As is apparent from the foregoing description, in accordance with the lens drive controlling apparatus according to the first embodiment of the present invention, in an apparatus for adjusting the moving speed of a second lens which follows a change in the moving speed of a first lens, by measuring the moving speed of the first lens prior to actual operation of the apparatus, it is possible to accurately adjust the moving speed of the second lens in accordance with the state of the apparatus from the time of an initial movement of the first lens after the power switch has been turned on. Accordingly, it is possible to provide lens control which can achieve stable performance free from defocus and a satisfactory operational sensation.

In addition, it is possible to start the actual operation of the apparatus immediately after the power source has been turned on, by memorizing the position in which the first lens is placed before measurement of the moving speed of the first lens and returning the first lens to that position after the completion of the measurement.

A third embodiment of the present invention will be described below. In a lens drive controlling apparatus for a lens unit whose focus position varies with the movement of a zooming lens, if there is provided an arrangement for driving the focusing lens with the movement of the zooming lens while holding predetermined relation, the output of a zooming encoder may vary irregularly due to its non-linearity or chattering to disturb the moving speed of the focusing lens and cause defocus during zooming.

The third embodiment is intended to solve the above-described problem and to stabilize control by performing speed control of the focusing lens by using a design value with the measured value of a zooming speed being ignored in a case where the measured value is anomalously large or small or where hunting occurs in the output of a measurement circuit.

Since the arrangement of the circuit of the third embodiment is substantially identical to that of the circuit of the first embodiment shown in FIG. 7, description is omitted.

The difference between the first and third embodiments resides in a control algorithm for the lens drive controlling circuit 117, and the following explanation is made in connection with the control algorithm.

Figure 11A:
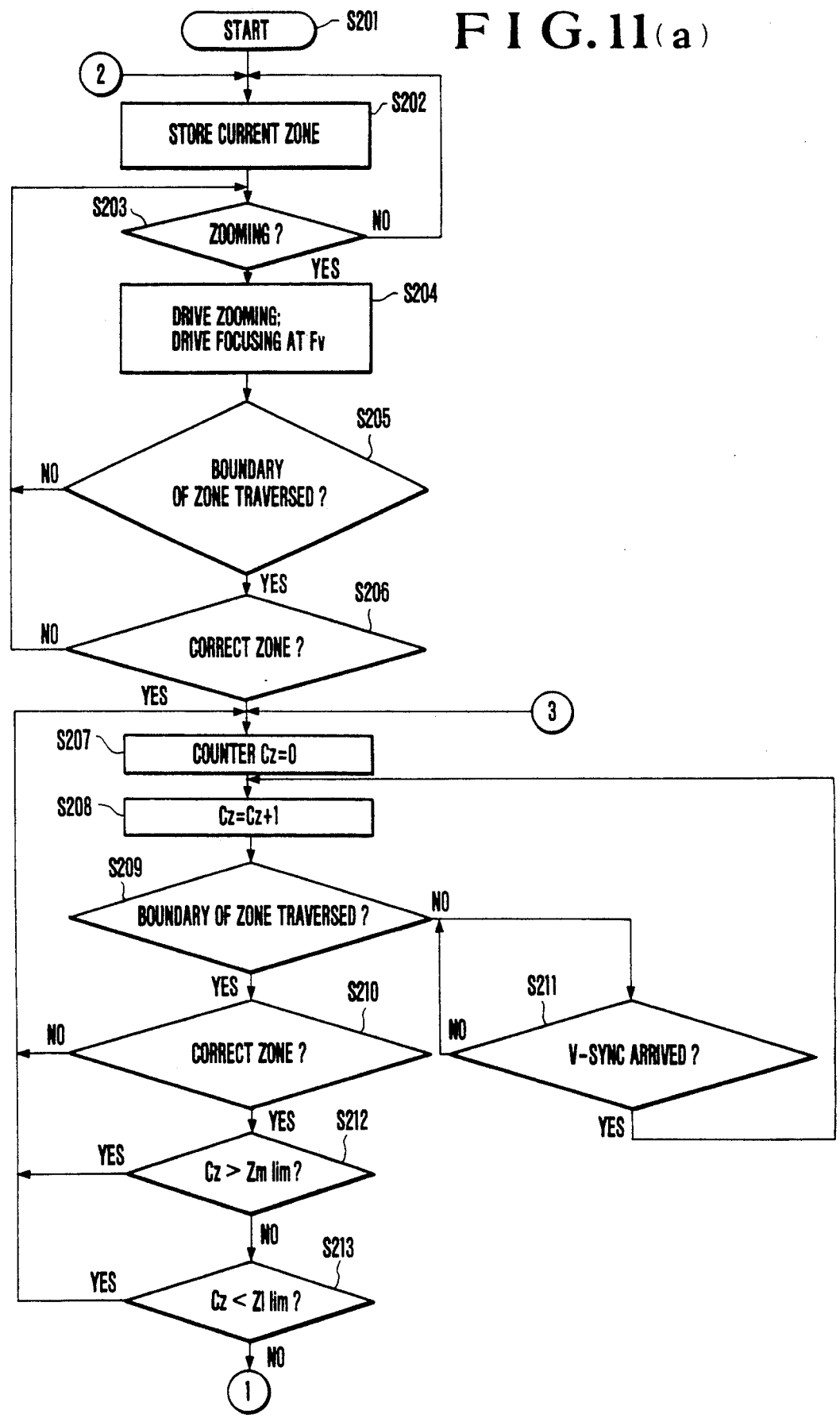
FIGS. 11(a) and 11(b) are a flowchart showing a control operation in a third embodiment of the present invention.
Figure 11B:
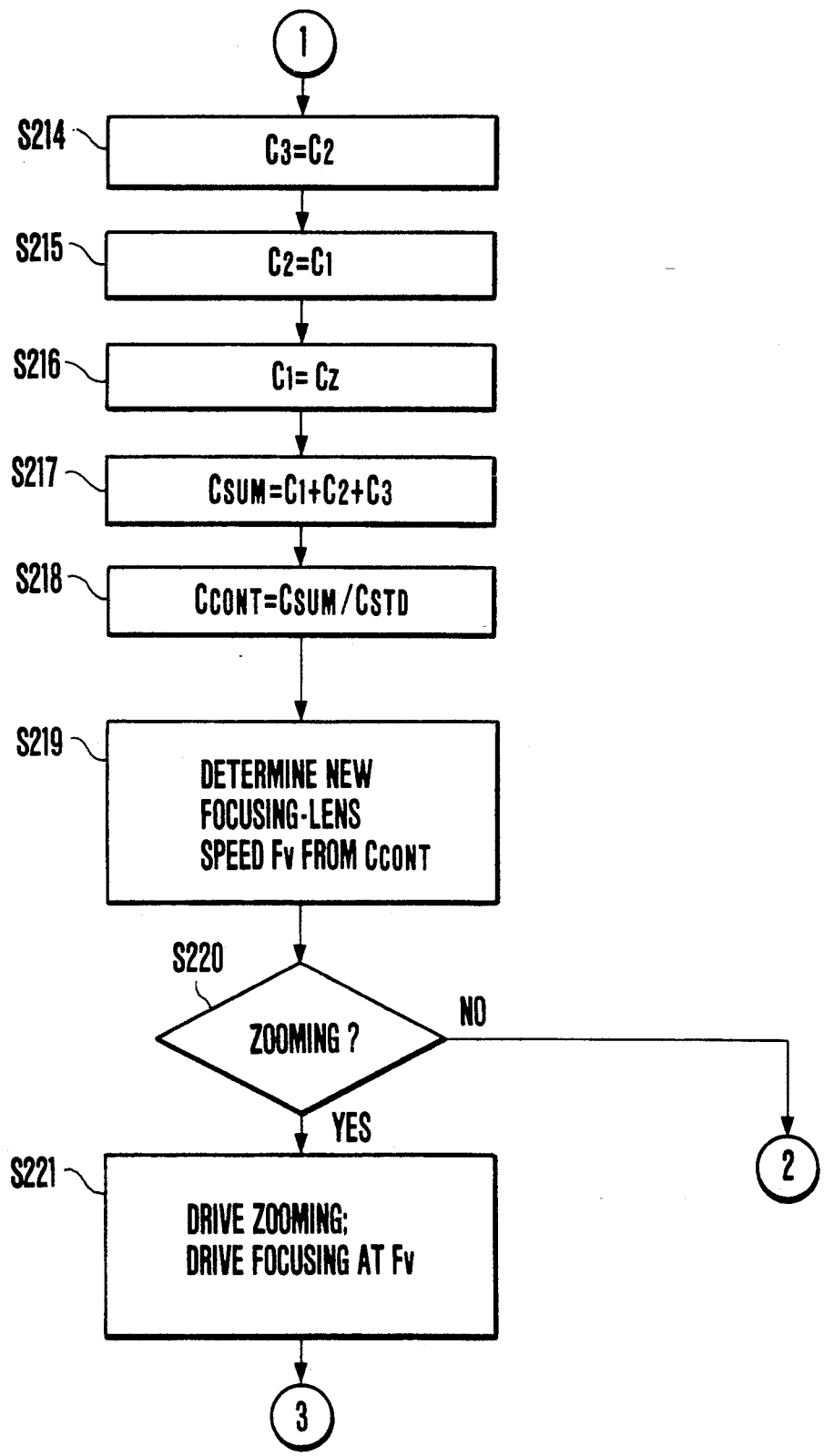

FIGS. 11(a) and 11(b) show a control flowchart of an operation control program which is stored in the lens drive controlling circuit 117 for the purpose of operating the third embodiment of the lens drive controlling apparatus according to the present invention.

The flowchart shown in FIGS. 11(a) and 11(b) includes the following steps: Step S201 where this control flow is started; Step S202 where a decision is made as to the current position in which the zooming lens 102 is located, that is, the zone in which the zooming lens 102 is located from among the zones shown in FIG. 3, and the result is stored in memory within the lens drive controlling circuit 117; Step S203 where whether to execute zooming is determined on the basis of whether a zooming operation has been carried out; Step S204 where the zooming lens 102 is caused to move in a specified direction while the focusing lens 105 is being driven at a speed Fv; Step S205 where it is determined whether the zooming lens 102 has moved from a particular zone into the next zone beyond the boundary therebetween as shown by 401 in FIG. 4; Step S206 where it is determined whether a zone which the zooming lens 102 has newly entered is a correctly adjacent zone in relation to both the zone stored in memory in Step S202 and the direction in which the zooming lens 102 is being driven; Step S207 where a count Cz of a counter for counting the time for the zooming lens 102 to pass through a zone is reset; Step S208 where when the counter initiates its counting operation, the count Cz is incremented by one; Step S209 where it is determined whether the zooming lens 102 has traversed the zone in which it is moving; Step S210 where it is determined whether a zone into which the zooming lens 102 has moved is a correctly adjacent zone, as in Step S206; Step S212 where it is determined whether the count Cz of the counter is greater than a predetermined upper limit Zmlim; Step S213 where it is determined whether the count Cz is smaller than a predetermined lower limit zilim; and Step S211 where it is determined whether a sync signal V-sync has arrived.

The flowchart shown in FIGS. 11(a) and 11(b) also includes Steps S214, S215 and S216 where the measurement results obtained when the zooming lens 102 passes through the last zone as well as the second and third zones from the last zone are stored as variables C3, C2 and C1 on memory, respectively. Specifically, if it is confirmed that counting for the count Cz has been correctly executed as the result of execution of the control flow up to Step S213, the variable C2 is substituted for the variable C3, the variable C1 for the variable C2, and the variable Cz for the variable C1, whereby the values stored on memory are shifted and updated. The flowchart also includes: Steps S217 where the sum of the variables C1, C2 and C3 is obtained; Step S218 where a ratio CCONT of a measured value Csum to a theoretical design value CSTD is obtained (the time taken for the zooming lens 102 to pass through three zones is CSTD=79, as shown in FIG. 4, where CSTD represents the number of sync signals V-sync); and Step S219 where the actual focusing-motor speed Fv is newly calculated by multiplying a coefficient determined by the ratio CCONT by a memorized focusing-motor speed for zooming. It is, therefore, possible to improve the accuracy with which the focusing lens 105 is made to follow the actual movement of the zooming lens 102 by calculating the ratio of the normal speed of the zooming lens 102 to the actual speed thereof with respect to a zone of interest and correcting the memorized speed of the focusing lens 105.

The flowchart also includes Step S220 where it is determined whether zooming is being performed and Step S221 where a focusing motor is driven at the calculated focusing-motor speed FV.

When the control program is started in Step S201, a zone in which the zooming lens 102 is presently positioned is determined and memorized by means of the zooming encoder 112. In Step S203, it is determined whether a zoom instruction has been given. If no zoom instruction has been given, the process returns to Step S202 and remains in its ready state. More specifically, if no zooming is performed, a focus position does not change and, therefore, after normal automatic focusing has been executed, no defocus will occur so far as no relation to a subject changes. If it is determined in Step S203 that the zoom instruction has been given, the focus position varies with the movement of the zooming lens 102 and it is, therefore, necessary to cause the focusing lens 105 to follow the movement of the zooming lens 102.

Figure 2:
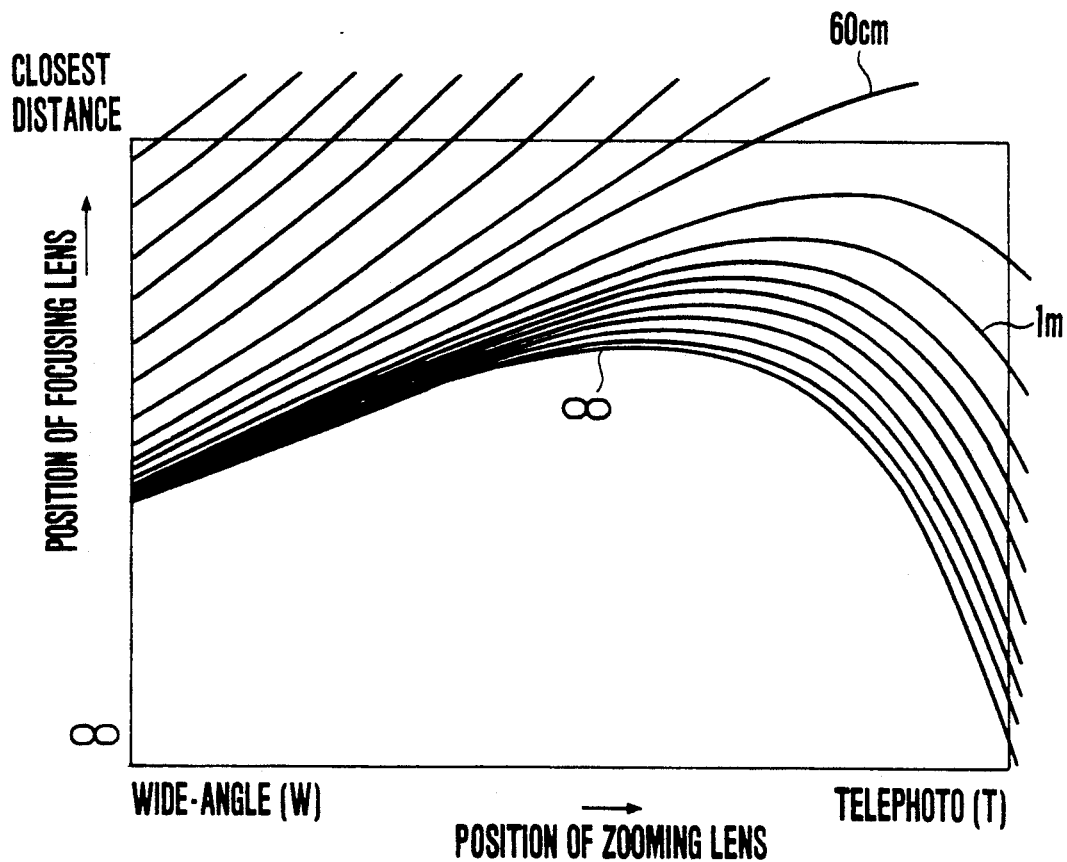
FIG. 2 is a characteristic diagram showing the positional relation between a zooming lens and a focusing lens with a subject distance as a parameter.

Accordingly, at the same time that the zooming lens 102 is driven, the focusing lens 105 serving also as a compensator lens is made to move at the predetermined focusing-lens driving speed Fv so as to trace a corresponding locus of the loci shown in FIG. 2. As described previously, if the locus is being accurately traced, no defocus will occur during zooming.

While the locus of FIG. 2 is being traced, it is determined in Step S205 whether the zooming lens 102 has traversed the boundary of a zone in which the zooming lens 102 is moving. For example, if zooming starts at the point A of FIG. 4, it follows that the time taken for the zooming lens 102 to move in the zone which contains the point A is measured from an intermediate position in that zone. As a result, only a measured value relative to the zone which contains the point A will be extremely small and a large error will be contained in the measurement result. For this reason, in Step S205, the process waits for the zooming lens 102 to arrive at the boundary of the zone since measurement according to the third embodiment is performed with the entire zone regarded as one measurement range. If a change in a zone value is detected in Step S205, it is determined in Step S206 whether a new zone is a correct zone.

Figure 6:
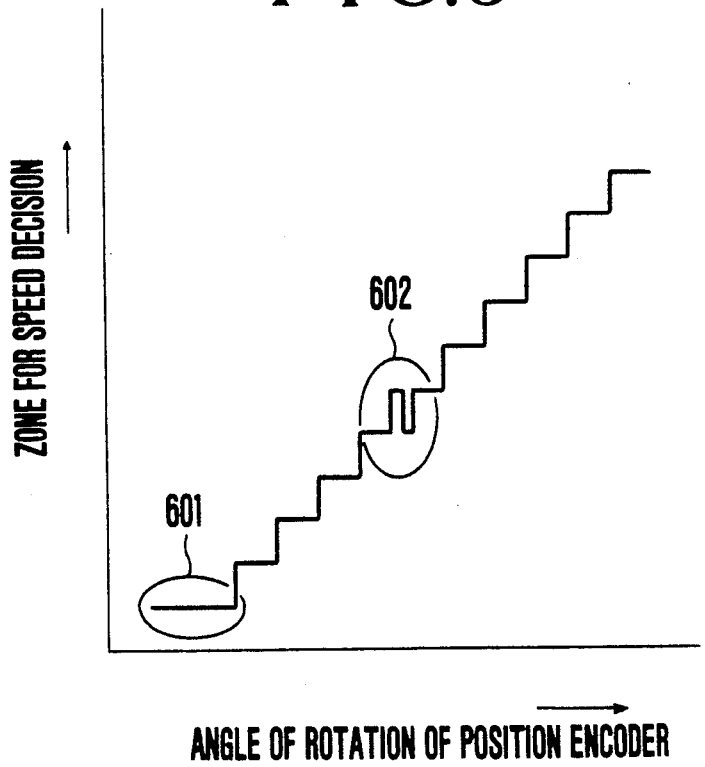
FIG. 6 is a characteristic chart showing the relation between the angle of rotation of the position encoder and a zone decision level.

For example, if a chattering phenomenon occurs as shown by 602 in FIG. 6, the level of a zone value indicative of the zone changes but the transition from one zone to another is not actually performed. It is apparent, therefore, that the zone value is not a value corresponding to the next zone. To cope with this problem, in Step S206, the zone value of the adjacent zone which follows in the zoom-driving direction is predicted on the basis of the zone value memorized in Step S202 and it is determined whether the predicted value coincides with an actual zone value. If no change is detected in the zone value in Step S205, the process returns to Step S203 and zooming is continued. Even if it is determined in Step S206 that the new zone is not a correct zone, no counting is performed and the process returns to Step S203.

If it is determined in Step S206 that the zooming lens 102 has entered a correct zone, the process proceeds to Step S207, where a counter for calculation of a zooming-lens driving speed is reset to 0. In Step S208, 1 is added to the count of the counter, and in Step S209 it is determined whether the zooming lens 102 has entered the next adjacent zone. If the zooming lens 102 has not yet entered the next adjacent zone, the process proceeds to Step S211, where the process waits for arrival of a vertical sync signal. If a vertical sync signal arrives, the process returns to step S208. In consequence, at the instant when it is determined in Step S209 that the zooming lens 102 has entered the next adjacent zone, the zooming lens 102 completes passing through a single zone, and the number of vertical sync periods required for the zooming lens 102 to pass through the zone is memorized as the count Cz of the counter. Subsequently, in Step S210, processing similar to that of Step S206 is performed to determine whether the zone for which the zooming lens 102 has entered is a correct adjacent zone. In Steps S211 and S212, it is determined whether the count Cz is anomalously large or small like the result obtained when the part 601 or 602 in FIG. 6 is measured. Only when the program proceeds to Step S212, it is determined that the zooming-lens driving speed has been correctly measured. If it is determined in Step S210, S211 or S212 that the measurement data is inappropriate, the process returns to Step S207, where the count Cz is reset, and measurement is restarted.

In Steps S214, S215 and S216, the memories C3, C2 and C1 are updated in sequence by using the count Cz which is a correct measurement result. The reason why the measured values relative to the past three zones through which the zooming lens 102 has passed are employed is to absorb a fine variation in the length of each zone and to permit smooth zooming to be continued without unnatural operation by continuously using data on a zone close to a zone of interest even if the measured value of the zooming-lens driving speed relative to the zone of interest is not adopted in processing prior to Step S214. In Step S217, the sum of the three counts C1, C2 and C3 is obtained, and in Step S218 the sum is compared with reference data (CSTD=79:79 sync signals V-sync). In Step S219, the result CCONT of the comparison made in Step S218 is employed to determine a new focusing-lens driving speed Fv according to the zooming-lens driving speed. If it is determined in Step S220 that zooming continues, the process proceeds to Step S221, where the focusing lens 105 is driven at the new driving speed Fv calculated according to the state of driving of the zooming lens 102. The process then returns to Step S207. If zooming is stopped, the process returns to Step S202. Subsequently, the above-described operation is repeated.

With the above-described processing, as a zooming speed is being measured, if it is determined that an imperfect measurement has occurred, it is possible to again perform measurement without applying the imperfect measurement data. Accordingly, it is possible to always accurately set the speed at which the focusing lens 105 is made to follow the movement of the zooming lens 102 according to the actual speed thereof. It is also possible to accurately trace the relative movement loci between the zooming lens and the focusing lens, such as those shown in FIG. 2, thereby effecting zooming free from defocus.

In other words, even if there are variations in the driving speed of the zooming lens or the output of the encoder, the focusing lens can be made to follow the actual driving of the zooming lens with accuracy.

Figure 12:
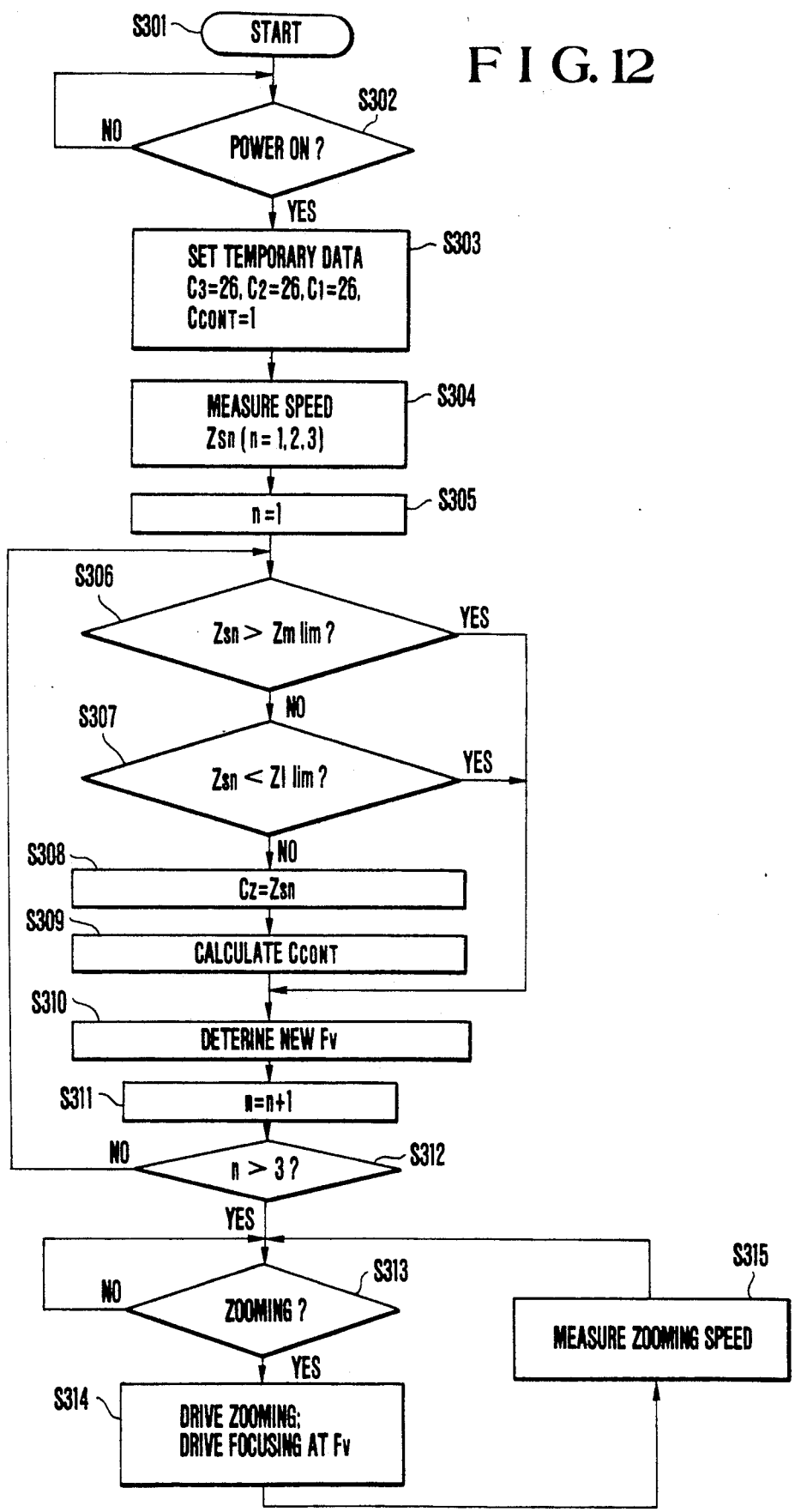
FIG. 12 is a flowchart showing a control operation in a fourth embodiment of the present invention.

FIG. 12 is a control flowchart showing the control program of the lens drive controlling circuit 117 used in a video camera, and shows a fourth embodiment of the present invention. This embodiment utilizes a control algorithm in which when a power source is turned on, the operation of measuring a zooming-lens driving speed and that of setting a focusing-lens driving speed are carried out, and in which if an abnormality is detected, preset temporary data is employed. The configuration of any part other than this control algorithm is similar to that explained in connection with the third embodiment.

The flowchart shown in FIG. 12 includes the following steps: Step S301 indicating the start of the control program; step S302 where the program waits for the power source to be turned on; Step S303 where initialization is performed by substituting temporary data, for example "26", i.e., a value indicating the passage of the zooming lens 102 through each zone when the zooming lens 102 passes through its zooming movement range in 7 seconds, for each of the variables C1, C2 and C3 on memory which have been explained in connection with the control flow of the third embodiment shown in FIGS. 11(a) and 11(b), and also by substituting "1" for CCONT as temporary data.

The flowchart also includes: Step S304 where, as the zooming lens 102 is made to move for three zones in advance, the number of vertical sync periods required for the zooming lens 102 to pass through each of the three zones is measured and the measurement results regarding the respective three zones are memorized as variables ZS1, ZS2 and ZS3 on memory; Step S305 where a count n of a counter for setting the number of repetitions of the flow is set to "1"; Step S306 where it is determined whether ZS1, ZS2 and ZS3 are each greater than a preset upper limit, Zmlim, by a method similar to that used in Step S212 of FIG. 11(a); Step S307 where it is determined whether ZS1, ZS2 and ZS3 are each smaller than a preset lower limit, Zilim, by a method similar to that used in Step S213 of FIG. 11(b); Step S308 where ZS1, ZS2 or ZS3 is selectively substituted f or the count Cz explained in connection with the third embodiment; Step S309 for executing processing identical to the processing shown in Steps S214, S215, S216, S217 and S218 explained in connection with the third embodiment; Step S310 for determining a new focusing-lens driving speed which is corrected according to an actual zooming-lens driving speed on the basis of the result of the computations performed in Step S309; Step S311 where a count n of a counter for counting the number of repetitions is incremented by "1"; Step S312 where it is determined whether the number of repetitions of the control flow has reached its maximum number; Step S313 where it is determined whether zooming has been initiated; Step S314 where the zooming lens 102 is driven while the focusing lens 105 is being driven at the focusing-lens driving speed Fv determined in Step S310; Step S315 for performing processing similar to the processing of measuring a zooming-lens driving speed, which processing is shown in Steps S205 to S213 in the flowchart of FIG. 11(a).

When the control flow is started in Step S301, the flow waits for the power source to be turned on in Step S302. If it is determined in Step S302 that the power source has been turned on, execution of the subsequent steps of the control flow is initiated. In other words, the fourth embodiment is arranged in such a manner that the processing of measuring the driving speed of the zooming lens 102 and the processing of determining the driving speed of the focusing lens 105 are carried out immediately after the power source has been turned on.

When it is determined in Step S302 that the power source has been turned on, the process proceeds to Step S303, where predetemined temporary data are set in C1, C2, C3 and CCONT, respectively, thereby effecting initialization.

Then, for example, an operation for automatically moving the zooming lens 102 for three zones is performed to measure the speed at which the zooming lens 102 passes through each of the three zones as the number of vertical sync periods, as in the third embodiment described above. The results are stored in the variables ZS1, ZS2 and ZS3 on memory, respectively.

Then, in Step S305, the count n of the counter for setting the number of repetitions is incremented by "1", and the process proceeds to Step S306 and then to Step S307. In Step S307, the value of each of the variables ZS1, ZS2 and ZS3 is compared with the upper limit value Zmlim and the lower limit value Zilim to determine whether the value is an abnormal value. If no abnormal value is detected, the value of the variables ZS1, ZS2 or ZS3 is substituted for the value of Cz and, in Step S309, CCONT is calculated by a method similar to that used in the third embodiment.

If any abnormal data is detected in Steps S306 and S307, the values of C1, C2, C3 and CCONT are not updated and a new focusing-lens driving speed Fv is determined on the basis of temporary data. After the passage through Steps S310 and S311, the control program is repeated from Step S306. By performing this control loop, the temporary data are assigned to a zone on which abnormal data has been detected, while a measured value is assigned to a zone which has been regarded as correct. Accordingly, it is possible to smoothly start zooming under conditions close to actual operating conditions without undergoing disturbance due to an abnormal value.

Since the focusing-lens driving speed Fv according to the measured value is determined when the process reaches Step S313 through Step S311, a zooming operation similar to that performed in the third embodiment is carried out in the control loop formed by Steps S314 and S315.

In the explanation of the fourth embodiment, for the sake of simplicity, reference has been made to the method in which temporary data is used only when the value of CZ are abnormal. However, it is apparent that a program for determining whether the order of zones is correct can be easily added to the aforesaid program, as in the third embodiment.

As is apparent from the foregoing description, the lens drive controlling apparatus according to the fourth embodiment is arranged to control moving objects which move on the basis of predetermined relation, such as a zooming lens and a focusing lens in an inner focus type of video camera. The lens drive controlling apparatus is provided with the function of detecting the actual position or speed of a primary moving object during the movement thereof and determining the driving speed of a subsidiary moving object and of controlling the subsidiary moving object by ignoring an abnormal value or replacing it with temporary data if the abnormal value is detected among measured values. Accordingly, it is possible to achieve smooth and natural speed control without impairing the result of processing employing a position detecting signal.

A fifth embodiment of the present invention will be described below.

Immediately after a power source has been turned on, a system does not stabilize and it may be difficult to perform perfect measurement of a zooming speed in a manner similar to that explained in connection with the fourth embodiment. According to the fifth embodiment, in this case, during the start of zooming, the zooming lens is made to move on the basis of temporary measurement data and the measurement of the speed of the zooming lens is continued while the zooming lens is moving. When the measurement is completed, the temporary measurement data are sequentially replaced with actual measurement data.

Since the arrangement of the fifth embodiment is similar to that of the first embodiment which is shown in FIG. 7 in block form, explanation is omitted. Only a control algorithm which is stored in the lens drive controlling circuit 117 and which differs from that used in each of the aforesaid embodiments will be described below.

Figure 13:
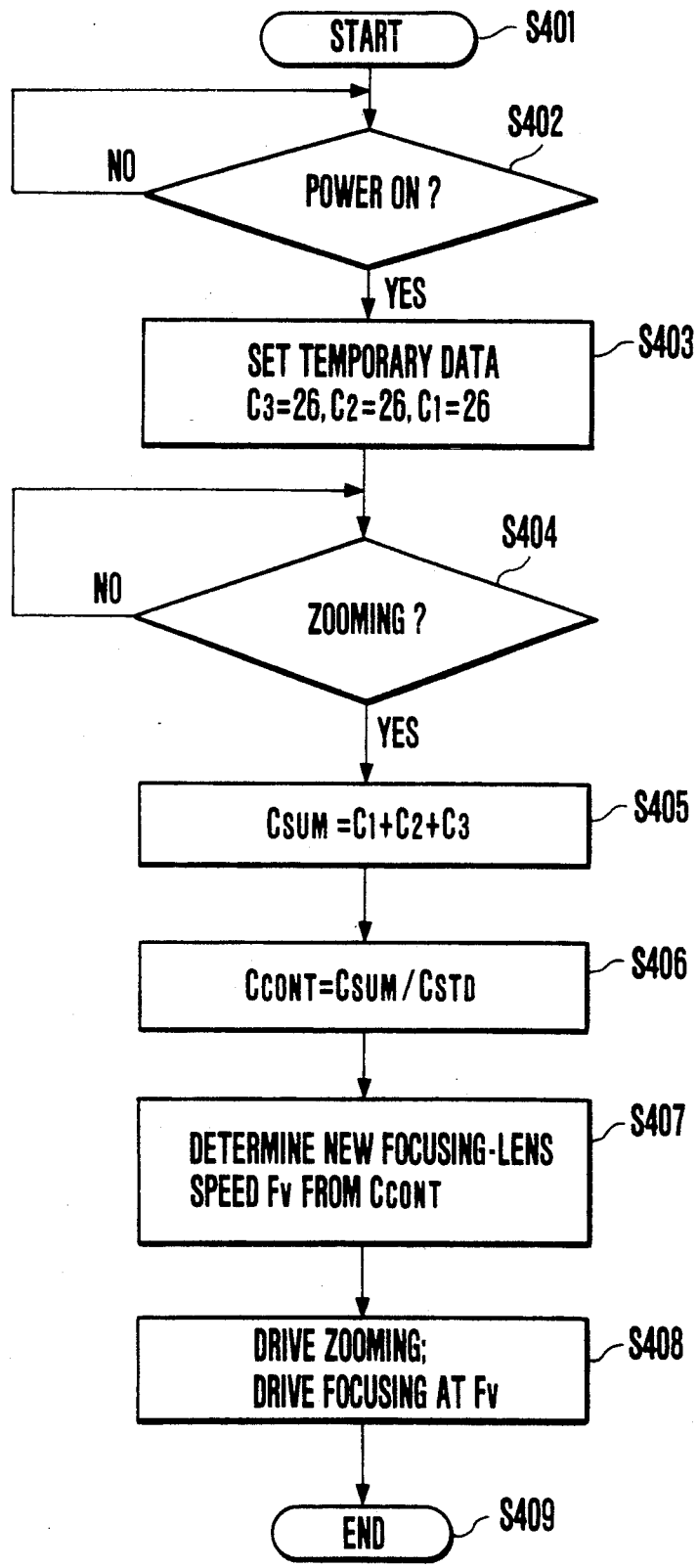
FIG. 13 is a flowchart showing a control operation in a fifth embodiment of the present invention.

FIG. 13 shows the fifth embodiment of the present invention, and shows the control flowchart of a program for operation control which is stored in the lens drive controlling circuit 117 for operating the lens drive controlling apparatus.

The control flowchart includes: Step S401 which starts the control flow; Step S402 where the process waits for the power source of the apparatus to be turned on; Step S403 where temporary data, for example, "26", is substituted for each of C1, C2 and C3 which respectively indicate the passage periods of time required for the zooming lens 102 to pass through three zones which precede the zone 401 within the zooming movement range shown in FIG. 4 (each of the passage periods of time is represented by the number of vertical sync signals V-sync, and in this example the time taken to pass through one zone is assumed to be 26 V-sync); Step S404 where it is determined whether zooming is being performed through the operation of a zooming switch not shown; Step S405 which finds the sum of the passage periods of time C1, C2 and C3, i.e., the time Csum taken to pass through the three zones; Step S406 where the CSUM found in Step S405 is divided by the preset normal time CSTD (79 V-sync in FIG. 4) required for the zooming lens 102 to pass through the three zones, to obtain a ratio CCONT relative to zooming-lens speed changes; Step S407 where CCONT obtained in Step S406 is multiplied by the memorized speed shown in FIG. 3 to obtain the focusing-lens speed Fv; Step S408 where the focusing lens 105 is driven at the focusing-lens driving speed Fv obtained in Step S407 while the zooming lens 102 is being moved; and Step S409 which brings the control flow to an end.

In the following description of the fourth embodiment, reference is made to speed control utilizing a method of determining the focusing-lens driving speed Fv on the basis of the result of zooming-speed measurement regarding three zones through which the zooming lens has passed, while taking into account variations in an encoder output or the like.

Referring to the control flow of FIG. 13, when the control flow is started in Step S401, the process waits for the power source to be turned on in Step S402. When the power source is turned on, the process proceeds to Step S403, where a normal value ("26" in this example) as temporary data are substituted for each of the variables C1, C2, and C3 which respectively store the passage periods of time required for the zooming lens 102 to pass through continuous three zones. The reason why such normal data is temporarily inputted are that immediately after the power source has been turned on, there is no information on the past zooming-lens driving speed, i.e., the time required for the zooming lens 102 to pass through each of the zones. Accordingly, even if the zooming lens 102 is driven immediately after the power source has been turned on, it is possible to stably drive the zooming lens 102 without malfunction.

In Step S404, it is determined whether a zooming operation has been carried out. If zooming is being performed by the operation of a zooming switch not shown, the process proceeds to Step S405, where the sum CSUM of the passage periods of time C1, C2 and C3 is calculated. In Step S406, the ratio CCONT of CSUM to the normal time CSTD which represents the normal value of the time required for the zooming lens 102 to pass through the three zones, i.e., a zooming-lens driving speed obtainable when the focusing-lens driving speed shown in FIG. 3, is determined.

In Step S407, CCONT is multiplied by a set speed relative to a zone of interest among the zones shown in FIG. 3, and a focusing-lens driving speed during zooming with respect to the temporary data substituted in Step S403 is determined. In Step S408, while the zooming lens 102 is being driven, the focusing lens 105 is driven at the driving speed Fv in follow-up relation to the zooming lens 102.

Thus, it is possible to provide follow-up control over the focusing lens 105 so as to accurately trace a corresponding one of the curves of FIG. 2 with respect to the driving of the zooming lens 102. Since the speed with which the focusing lens 105 is driven in follow-up relation is determined by measuring and detecting the actual driving speed of the zooming lens 102, it is possible to achieve stable, highly accurate and smooth zooming.

As is apparent from the foregoing explanation, CCONT is equivalent to Rzs shown in the aforesaid equation (1). RZS is a ratio relative to one zone in the zooming movement-range whereas CCONT is a value relative to three zones. To clarify the method of speed control processing, the flow of FIG. 13 includes the processing of calculating CCONT for temporary data. However, since CCONT can also be handled as temporary data, it may be practical to omit the procedures of Steps S405 and S406 and substitute temporary data immediately after CCONT.

In the above-described procedures, after the power source has been turned on, if the measurement of a zooming speed has not yet been completed, temporary data are substituted for C1, C2 and C3 as well CCONT to determine the focusing-lens driving speed Fv and drive the zooming lens 102. Accordingly, it is possible to perfom zooming without any serious defocus immediately after the power source has been turned on.

The explanation of the flowchart of FIG. 13 has referred to the setting of the focusing-lens driving speed during a zooming operation which is initially performed immediately after the power source is turned on. Then, referring to FIGS. 14(a) and 14(b), a control operation for measuring the driving speed of the zooming lens and determining the speed at which the focusing lens is driven in follow-up relation will be described. The control operation is also performed by using a program stored in the lens drive controlling circuit 117 of FIG. 7. The arrangement of the system used is similar to that shown in FIG. 7.

Figure 14A:
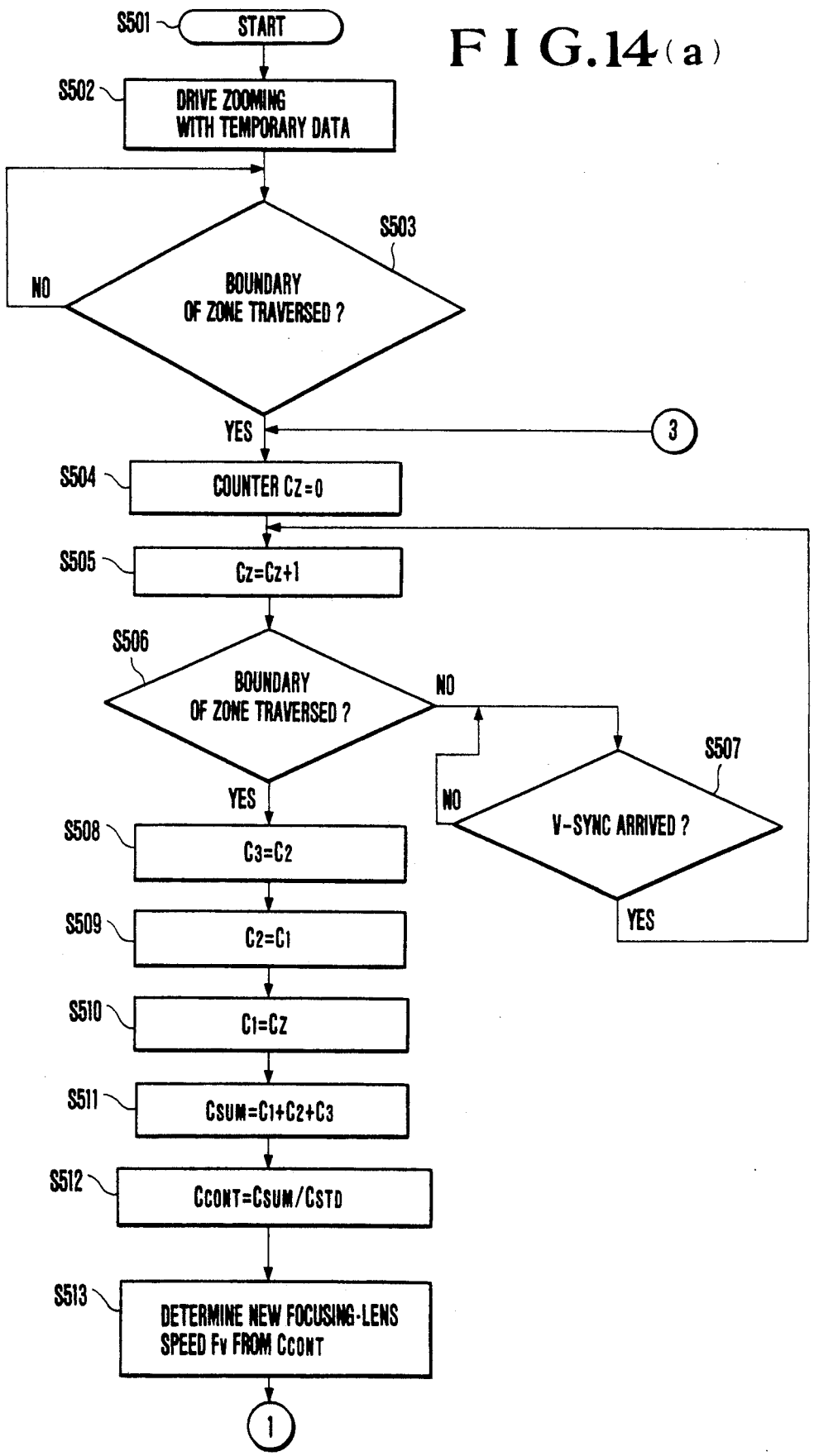
FIGS. 14(a) and 14(b) are a flowchart showing a control operation in a sixth embodiment of the present invention.
Figure 14B:
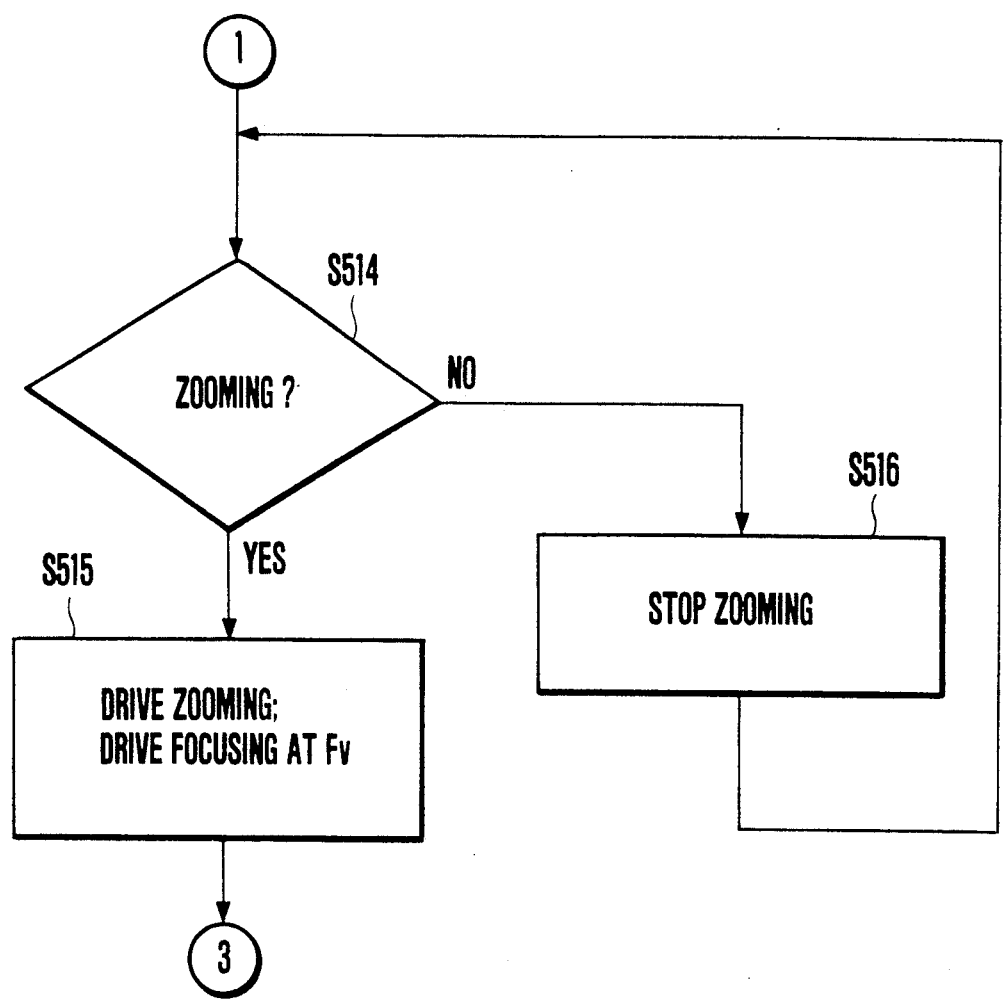

The control flow of FIGS. 14(a) and 14(b) includes: Step S501 indicating the start of the control flow; Step S502 where after the power source has been turned on, zooming is initiated by executing the process shown in Steps S401 to S409 of FIG. 13; Step S503 where it is determined whether the zooming lens 102 first traversed the boundary of one zone, such as that shown by 401 in FIG. 4, after the zooming is initiated; Step S504 where the counter Cz for measuring the speed at which the zooming lens 102 passes through the zone is reset to 0; Step S505 where the count of the counter Cz is incremented by one; Step S506 where it is determined, as in Step S503, whether the zooming lens 102 has moved from a zone in which the zooming speed is presently being measured into an adjacent zone; Step S507 where it is determined whether a vertical sync signal has arrived; Steps S508, S509 and S510 where the contents of the respective variables C1, C2 and C3 in which the passage periods of time for the past three zones have been stored as explained in connection with FIG. 13, are shifted by one each, and data is updated with the past history left by substituting the latest zooming-speed measured value for C1; Step S511 where the sum CSUM of the time periods C1, C2 and C3 required for the zooming lens 102 to pass through the respective three zones is computed, as shown in Step S405 of FIG. 13; Step S512 where the aforesaid sum Csum is divided by the preset normal time CSTD (79 V-sync in FIG. 4) required for the zooming lens 102 to pass through the three zones to compute the ratio CCONT, as shown in Step S406 of FIG. 13; Step S513 where CCONT computed in Step S512 is multiplied by the normal speed for each of the zones shown in FIG. 3, thereby computing the focusing-lens driving speed Fv according to an actual zooming-lens driving speed; Step S514 where it is determined whether zooming is being performed; Step S515 where the zooming lens 102 is driven and, at the same time, the focusing lens 105 is driven at the focusing-lens driving speed Fv; and Step S516 which stops the zooming operation of driving the zooming lens 102 and the focusing lens 105 so as to trace a locus according to the result of the decision made in Step S514.

When the control flow is started in Step S501, the process proceeds to Step S502. In Step S502, as shown in the control flow of Steps S401 to S409 of FIG. 13, the process waits for the zooming switch not shown to be operated, and if the zooming switch has been operated, the normal value is used as temporary data to drive the zooming lens 102, thereby initiating zooming. In Step S503, during zooming, it is determined whether the zooming lens 102 has traversed the boundary of one zone such as that shown by 401 in FIG. 4, on the basis of information from the zooming encoder 112. If the zooming lens 102 traverses the boundary of one zone, the process proceeds to Step S504. Such a decision as to the boundary of the zone is made by utilizing the encoder's output variations shown in FIG. 6. The reason why the boundary of the zone is supervised in Step S503 is as follows. If the zooming lens 102 is positioned at the point A in FIG. 4 immediately after the start of zooming, the distance from the point A to the first boundary is shorter than the actual length of the zone, with the result that the measured value of the speed at which the zooming lens 102 moves from the point A to the boundary contains a large error. Accordingly, after the start of zooming, the processing is controlled so that no measurement of the zooming-lens driving speed is executed until the first boundary of the zone is detected.

In Step S504, the counter Cz for measuring the passage time required for the zooming lens 102 to pass through a zone in order to detect the zooming-lens driving speed is reset to 0. In Step S505, the count of the counter Cz is incremented by one, and in Step S506 the boundary between the current zone and the next zone is detected.

If it is determined in Step S506 that the zooming lens 102 has not yet moved into the next zone, the process proceeds to Step S507, where it waits for arrival of the vertical sync signal V-sync. If the vertical sync signal V-sync is detected in Step S507, the process returns to Step S505, where the count of the counter Cz is incremented by one.

The above-described steps S505, S506 and S507 are repeated. If the boundary is detected in Step S506, the process proceeds to Step S508. In consequence, the counter Cz memorizes how many vertical sync periods were taken for the zooming lens 102 to pass through one zone. Thus, in Steps S508, S509 and S510, the latest count Cz is substituted for C1, C1 for C2, and C2 for C3, whereby the three data are shifted and updated, respectively.

For example, where the count Cz is 30 in terms of the number of V-sync, since the initial value "26" has been stored in each of C1, C2 and C3, C3=26, C2=26 and C2=30 are obtained. In this case, after the passage through Step S511 and S512, a new focusing-lens driving speed Fv is computed and determined in Step S513 on the basis of the aforesaid equation (1) by using CCONT obtained in Step S512. The new focusing-lens driving speed Fv is slower than when three temporary data are used as initial values, for C1 has changed from "26", to "30".

If the new focusing-lens driving speed Fv is determined in Step S513, it is determined in Step S514 whether the zooming switch is being operated. If it is being operated, an instruction to activate zooming is outputted to the actuator drivers 109 and 111 in Step S515, and the process returns to Step S504. If the zooming switch is not being operated, the process proceeds to Step S516, where zooming is stopped, and it waits for the next zoom instruction in Step S514.

By executing the above-described program, it is possible to smoothly execute the operation of initially driving the zooming lens with temporary data at the start of zooming and subsequently transferring speed control to a control operation using measurement data in sequence. Accordingly, it is possible to stably drive the focusing lens in follow-up relation to the zooming lens from the start of zooming without greatly departing from the loci shown in FIG. 2 and it is also possible to effect zooming without defocus.

As described above, in accordance with a drive controlling apparatus according to the present invention, in a control system including a first moving object and a second moving object which follows the first moving object on the basis of predetermined relation, the follow-up speed of the second moving object is determined on the basis of the result obtained by measuring the moving speed of the first moving object so that it is possible to achieve highly accurate and stable control. In addition, if the speed measurement of the primary first moving object is imperfect as in a case where control is initially performed after a power source has been turned on, a temporary measurement result is employed to drive the subsidiary second moving object in accordance with the movement of the first moving object. At the instant when the speed measurement of the primary first moving object is completed, the temporary measurement result is sequentially replaced with an actual measurement result. Accordingly, even if no measurement data on the primary first moving object is obtained, it is possible to execute speed control of the subsidiary second moving object without a large error. In addition, it is possible to smoothly transfer speed control from the speed control of the subsidiary second moving object based on temporary measurement data to the speed control of the subsidiary second moving object based on actual measurement data. Accordingly, the present invention can be effectively used in the control system for driving the zooming lens and the focusing lens while holding them in predetermined relation.

What is claimed is:

1. A lens driving apparatus comprising:

(A) a first lens;
(B) a second lens driven in follow-up relation to a movement of said first lens on the basis of a predetermined characteristic;
(C) speed detecting means for detecting a driving speed of said first lens; and
(D) controlling means for determining a driving speed of said second lens on the basis of a detection result provided by said speed detecting means.

2. A lens driving apparatus according to claim 1, wherein said controlling means is arranged to perform computations on the driving speed of said second lens in accordance with a supply of electric power.

3. A lens driving apparatus according to claim 1, wherein said second lens has different driving speeds set in advance with respect to a plurality of positions over which said first lens moves.

4. A lens driving apparatus according to claim 3, wherein the different driving speeds of said second lens are stored on a memory table, speed information being selected from the memory table on the basis of a position of said first lens and a position of said second lens.

5. A lens driving apparatus according to claim 4, wherein said first lens is a zooming lens and said second lens is a compensator lens.

6. A lens driving apparatus according to claim 5, wherein said second lens also serves as a focusing lens.

7. A lens driving apparatus according to claim 2, wherein said controlling means drives said first lens by a small amount in accordance with the supply of electric power, detects a speed of said first lens which is being driven, compares the speed with a first speed, and corrects the driving speed of said second lens according to an error between the speed and the first speed.

8. A lens controlling apparatus comprising:
(A) a zooming lens;
(B) a focusing lens for correcting a variation of a focal position due to a movement of said zooming lens;
(C) speed controlling means for selecting a driving speed of said focusing lens on the basis of position information on said zooming lens and that on said focusing lens;
(D) driving speed measuring means for measuring the driving speed of said zooming lens; and
(E) correcting means responsive to said driving speed measuring means for correcting the driving speed of said focusing lens on the basis of a result obtained by measuring the driving speed of said zooming lens.

9. A lens controlling apparatus according to claim 8, wherein said speed controlling means includes a memory which stores driving speeds for individual zones, which driving speeds are determined on the basis of a position of said zooming lens and that of said focusing lens.

10. A lens controlling apparatus according to claim 8, wherein said correcting means drives said zooming lens by a small amount in accordance with a supply of electric power, measures a speed of said zooming lens which is being driven, and corrects the driving speed of said focusing lens on the basis of a result obtained by measuring the speed.

11. A drive controlling apparatus comprising:
(A) measurement means for measuring a moving speed of a first moving object;
(B) a second moving object which follows a movement of said first moving object on the basis of predetermined relation;
(C) driving means for varying a moving speed of said second moving object with respect to the moving speed of said first moving object; and
(D) computing means for determining the moving speed of said second moving object on the basis of a measurement result provided by said measurement means.

12. A drive controlling apparatus according to claim 11, further comprising means for returning said first moving object to a position memorized in memory means after the completion of a measurement operation by said measurement means.

13. A drive controlling apparatus according to claim 11, further comprising means for varying the moving speed of said second moving object on the basis of the moving speed measured by said measurement means when the driving speed of said first moving object differs from the measured moving speed when said first moving object is driven after the measurement of the moving speed of said first moving object.

14. A drive controlling apparatus according to claim 11, further comprising means for interrupting the measurement operation during the movement of said first moving object while the moving speed of said first moving object is being measured by said measurement means.

15. A drive controlling apparatus according to claim 11, further comprising detecting means for detecting a position of said first moving object before the measurement operation by said measurement means is performed, said drive controlling apparatus being arranged to determine a direction in which said first moving object is made to move during the measurement operation, on the basis of position information provided by said detecting means.

16. A lens driving apparatus comprising: (A) a first lens; (B) a second lens driven in follow-up relation to a movement of said first lens in accordance with a predetermined characteristic;
(C) detecting means for detecting a moving speed of said first lens; and
(D) controlling means for executing control of a driving speed of said second lens on the basis of a detection result provided by said detecting means, said controlling means using the detection result as information on the control only when the detection result meets a predetermined condition.

17. A lens driving apparatus according to claim 16, wherein said controlling means controls the driving speed of said second lens by using a plurality of detection results provided by said detecting means.

18. A lens driving apparatus according to claim 16, wherein said controlling means is arranged to execute driving-speed control of said second lens by using a preset predetermined value when said controlling means does not use the detection result provided by said detecting means for driving-speed control of said second lens.

19. A lens driving apparatus according to claim 16, wherein said first lens is a zooming lens and said second lens serves both as a focusing lens and a compensator lens.

20. A control apparatus comprising:
(A) measurement means for measuring a moving speed of a first moving object;
(B) a second moving object which follows a movement of said first moving object on the basis of predetermined relation;

(C) driving means for varying a moving speed of said second moving object; and (D) computing means for computing the moving speed of said second moving object on the basis of a measurement result provided by said measurement means and for computing the moving speed of said second moving object on the basis of predetermined control information which is stored in advance, when the measurement result does not satisfy a predetermined condition.

21. A control apparatus according to claim 20, wherein said first moving object is a zooming lens and said second moving object is a focusing lens.

22. A control apparatus according to claim 20, wherein said driving means includes a memory for storing a driving speed of said second moving object.

23. A drive controlling apparatus comprising:
(A) a first lens;
(B) a second lens driven in follow-up relation to a movement of said first lens in accordance with a predetermined characteristic;
(C) detecting means for detecting a moving speed of said first lens; and
(D) controlling means for selectively setting a first control mode for controlling a driving speed of said second lens on the basis of a detection result provided by sqid detecting means and a second control mode for forcibly controlling said second lens irrespective of the detection result.

24. A drive controlling apparatus according to claim 23, wherein said controlling means is arranged to cause said second lens to move at a preset predetermined speed irrespective of the detection result as said first lens is initially driven after electric power has been supplied to said drive controlling apparatus.

25. A drive controlling apparatus according to claim 23, wherein said controlling means controls said second lens on the basis of temporary data corresponding to a predetermined amount of movement of said first lens or a predetermined moving speed thereof.

26. A drive controlling apparatus comprising:
(A) measurement means for measuring a moving speed of a first moving object;
(B) a second moving object which follows a movement of said first moving object on the basis of predetermined relation;
(C) driving means for varying a moving speed of said second moving object; and
(D) controlling means for selectively setting a first control mode for computing the moving speed of said second moving object on the basis of a measurement result provided by said measurement means and a second control mode for setting the moving speed of said second moving object to a predetermined value irrespective of the measurement result.

27. A drive controlling apparatus according to claim 26, wherein said first lens is a zooming lens and said second lens serves both as a focusing lens and a compensator lens.

* * * * *

UNITED STATES PATENT AND TRADEMARK OFFICE
CERTIFICATE OF CORRECTION

PATENT NO. : 5,287,223
DATED : February 15, 1994
INVENTOR(S) : Masahide Hirasawa It is certified that error appears in the above-indentified patent and that said Letters Patent is hereby corrected as shown below:

Col. 6, lines 40, 54. Delete "a"

and Change "flowchart" to -- flowcharts --.

Col. 7, line 44. Delete "It"

Col. 8, line 64. Change "Zzz" to -- Zze --.

Col. 12, line 37. Change "on" to -- in --.

Col. 15, lines 1, 63. Change "on" to -- in --.

Col. 16, line 1. Change "Zilim" to -- Zllim --.

Col. 16, line 29. Change "is" to -- are --.

Col. 17, line 51. Change "continuous three" to -- three continuous --.

Col. 17, line 52. Change "is" to -- are --.
Col. 17, line 53, change "are" to --is--.
Col. 18, line 23. Delete "-"

UNITED STATES PATENT AND TRADEMARK OFFICE
CERTIFICATE OF CORRECTION

PATENT NO. : 5,287,223
DATED : February 15, 1994
INVENTOR(S) : Masahide Hirasawa It is certified that error appears in the above-indentified patent and that said Letters Patent is hereby corrected as shown below:

Col. 19, lines 7, 8, change "respective three" to --three respective--.

Signed and Sealed this

Eighteenth Day of October, 1994

Attest:

BRUCE LEHMAN

Attesting Officer

Commissioner of Patents and Trademarks